United States Patent [19]
Morisawa

[11] Patent Number: 5,953,549
[45] Date of Patent: Sep. 14, 1999

[54] DEVICE FOR CONTROLLING IMAGE SIGNAL RECORDING OPERATION

[75] Inventor: Tahei Morisawa, Tokyo, Japan

[73] Assignee: Asahi Kogaku Kogyo Kabushiki Kaisha, Tokyo, Japan

[21] Appl. No.: 09/177,607

[22] Filed: Oct. 23, 1998

Related U.S. Application Data

[62] Division of application No. 08/554,244, Nov. 8, 1995, Pat. No. 5,857,125.

[30] Foreign Application Priority Data

| Nov. 11, 1994 | [JP] | Japan | 6-301467 |
| Nov. 11, 1994 | [JP] | Japan | 6-301468 |
| Nov. 25, 1994 | [JP] | Japan | 6-315489 |

[51] Int. Cl.$^6$ .................................................. G03B 19/00
[52] U.S. Cl. ................................................................ 396/429
[58] Field of Search ................................... 396/30, 429, 213

[56] References Cited

U.S. PATENT DOCUMENTS

| 4,489,351 | 12/1984 | D'Alayer de Costemore D'Are . |
| 4,887,161 | 12/1989 | Watanabe et al. . |
| 4,945,423 | 7/1990 | Takanashi et al. ................. 358/300 |
| 4,953,029 | 8/1990 | Morimoto et al. . |
| 4,956,713 | 9/1990 | Takanashi et al. . |
| 5,018,017 | 5/1991 | Sasaki et al. . |
| 5,159,458 | 10/1992 | Murata et al. . |
| 5,206,731 | 4/1993 | Takaiwa et al. . |
| 5,294,990 | 3/1994 | Aoki ................................. 348/363 |
| 5,424,156 | 6/1995 | Aoki et al. . |
| 5,467,204 | 11/1995 | Hatano et al. . |
| 5,488,601 | 1/1996 | Sakano et al. .................... 369/120 |
| 5,561,458 | 10/1996 | Cronin et al. . |
| 5,589,952 | 12/1996 | Sato et al. ....................... 358/487 |
| 5,631,700 | 5/1997 | Sato . |
| 5,638,103 | 6/1997 | Obata et al. . |
| 5,708,472 | 1/1998 | Morisawa et al. . |
| 5,739,849 | 4/1998 | Aoki et al. . |
| 5,808,675 | 9/1998 | Yamamoto . |
| 5,842,049 | 11/1998 | Aoki . |

FOREIGN PATENT DOCUMENTS

| 0327236 | 8/1989 | European Pat. Off. . |
| 5-2280 | 1/1993 | Japan . |
| 5-24706 | 4/1993 | Japan . |
| 5-150251 | 6/1993 | Japan . |
| 6-313894 | 11/1994 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

An image signal recording operation control device is provided in a still video camera. The control device has a photographing optical system by which an image is formed on an electro-developing recording medium, by which the image is electronically developed. The control device also has a scanner optical system by which the image developed by the electro-developing recording medium is formed on a sensor imaging plane. A line sensor is provided for scanning on the sensor imaging plane to read out the image. When the electro-developing recording medium is not mounted in the still video camera, i.e., when an aerial image formed by the photographing optical system is read by the line sensor, the scanner optical system is displaced by a predetermined amount along the optical axis, in comparison with a state in which the electro-developing recording medium is mounted, so that the scanner optical system can form an in-focus image on the sensor imaging plane.

21 Claims, 24 Drawing Sheets

DEVICE FOR CONTROLLING IMAGE SIGNAL RECORDING OPERATION

This is a divisional of application Ser. No. 08/554,244, filed Nov. 8, 1995, now U.S. Pat. No. 5,857,125 the contents of which are herein incorporated by reference in its entirety.

BACKGROUND OF THE INVENTION

1. Field of the Invention

The present invention relates to a device which keeps a visible image, corresponding to an optical image obtained through a photographing lens, on a recording medium and which can read the visible image from the recording medium.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time that the photograph is taken. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazo type photographic materials, free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed in which a recording medium made of the photographic material is electronically and directly developed similarly to a silver halide photographic material, so that the developed visible image can be immediately seen or recorded. Such a recording medium in which a visible image is electronically developed is referred to as an electro-developing recording medium in this specification.

Japanese Unexamined Patent Publication No. 5-2280, for example, discloses a recording medium which is a combination of an electrostatic information recording medium and an electric charge keeping medium, the electrostatic information recording medium having a photoconducting layer and an inorganic oxide material layer, and the electric charge keeping medium having a liquid crystal display. In this structure, when the electrostatic information recording medium is exposed while an electric voltage is applied to the electrostatic information recording medium and the electric charge keeping medium, electric charge in accordance with the amount of incident light is generated in the electrostatic information recording medium. Since the intensity of electric field applied to the liquid crystal display facing the electrostatic information recording medium is varied in accordance with the generated electric charge, an image corresponding to the amount of light distribution is indicated or developed on the liquid crystal display.

Japanese Unexamined Patent Publication No. 5-150251 discloses a dispersion type liquid crystal display in which an image indicated on the liquid crystal display is kept even if the electric field applied to the liquid crystal display is removed.

On the other hand, there is known a camera by which an image obtained by a photographing lens is formed on a plane in space as an aerial image, which is then formed onto an optical sensor through a scanner optical system to record the image on a recording medium.

The camera may be designed in such a manner that the electro-developing recording medium can be mounted, and the image developed by the electro-developing recording medium, or the aerial image can be recorded. However, since the electro-developing recording medium has sheets of glass for confining liquid crystal elements therein, the image position formed by the photographing optical system is changed depending upon whether or not the electro-developing recording medium is present, and thus the focusing position of the scanner optical system changes so that an in-focus image can not be formed on an optical sensor.

Further, when the image developed on the liquid crystal display is sensed by an optical sensor such as a line sensor, a light source is placed on one side of the liquid crystal display and the line sensor is placed on the other side of the liquid crystal display, and thus, a light beam, which is outputted by the light source and passes through the liquid crystal display, is read by the scanner optical system and the line sensor. Namely, the light source is provided on the optical axis of the scanner optical system. However, if the light source is positioned close to the electro-developing recording medium in a photographing operation, an eclipse (or vignetting) occurs on the recording medium, and thus the amount of light exposed onto the recording medium may be insufficient.

Furthermore, in such a structure, when the light source is located in a portion between the photographing optical system and the electro-developing recording medium, the back focus of the photographing optical system cannot be sufficiently short since the space that the portion occupies must be large enough to dispose or accommodate the light source, so that the degree of freedom of the design of the photographing optical system is low.

SUMMARY OF THE INVENTION

Therefore, an object of the present invention is to provide an image signal recording operation control device by which an in-focus image can be formed on an optical sensor whether a recording medium is mounted on the camera or not.

According to a first aspect of the present invention, there is provided an image signal recording operation control device comprising a photographing optical system, a scanner optical system, a recording medium and control means.

An image is formed on a photo imaging plane by a photographing optical system. The scanner optical system forms an image, which is formed on an object imaging plane, on a sensor imaging plane. The recording medium is detachably mounted in a portion containing the photo imaging plane and the object imaging plane. The control means controls the position of at least one of the photo imaging plane and the object imaging plane so that the photo imaging plane and the object imaging plane are coincident with each other whether the recording medium is mounted or not.

Another object of the present invention is to provide an image signal recording operation control device by which an eclipse does not occur so that the recording medium is always properly exposed.

According to a second aspect of the present invention, there is provided an image signal recording operation control device comprising, a photographing optical system, an electro-developing recording medium, an illumination optical system, a scanner optical system and a moving mechanism.

The electro-developing recording medium electronically develops an image formed by the photographing optical system. The illumination optical system illuminates the electro-developing recording medium. The scanner optical system can be provided in an optical path of a light beam which is outputted by the illumination optical system and which passes through the electro-developing recording medium. The moving mechanism moves the scanner optical system parallel to the electro-developing recording medium. The moving mechanism moves the illumination optical system so as to be offset from an optical path of said photographing optical system when the photographing optical system forms an image onto the electro-developing recording medium.

Further, another object of the present invention is to provide an image signal recording operation control device by which an eclipse does not occur so that the recording medium is always properly exposed, and the distance between the photographing optical system and the recording medium is sufficiently short.

According to a third aspect of the present invention, there is provided an image signal recording operation control device comprising, a photographing optical system, an electro-developing recording medium, an illumination optical system, a scanner optical system and a moving mechanism.

The electro-developing recording medium electronically develops an image formed by the photographing optical system. The illumination optical system illuminates the electro-developing recording medium. The illumination optical system is provided between the photographing optical system and the electro-developing recording medium. The scanner optical system can be positioned in an optical path of a light beam which is outputted by the illumination optical system and which passes through the electro-developing recording medium. The moving mechanism moves the illumination optical system and the scanner optical system parallel to the electro-developing recording medium. The illumination optical system and the scanner optical system are provided at a position which is offset from the optical axis of the photographing optical system.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
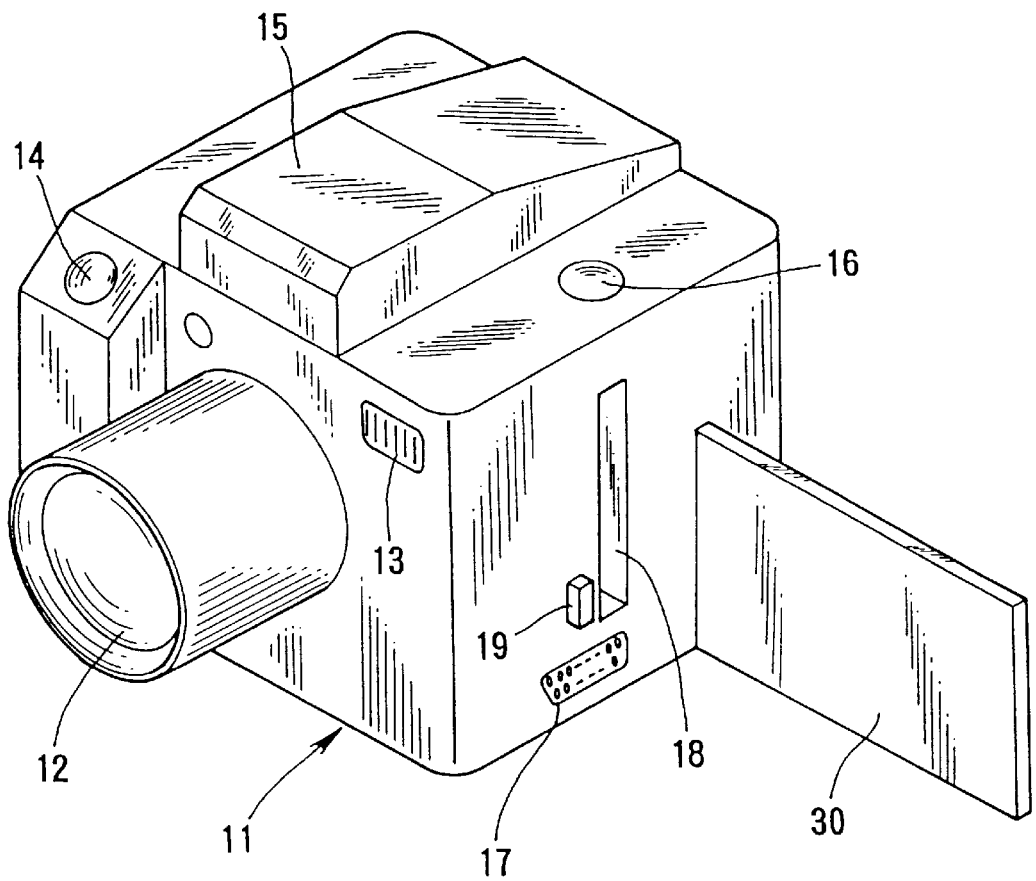
FIG. 1 is a perspective view showing a still video camera to which a first embodiment according to the present invention is applied.

FIG. 1 is an external view of a still video camera to which a first embodiment of the present invention is applied.

When viewing a camera body 11 from a front side, on the front surface of the camera body 11, a photographing optical system 12 including a photographing lens and so on is provided on approximately the central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and is extended from the front side of the camera body 11 to the rear side thereof. Further, on the upper surface, a scan start switch 16 is provided on a side of the view finder 15. On a side surface of the camera body 11, an output terminal 17 is formed on a lower portion thereof so that an image signal obtained by this camera is outputted to an external recording device. Further, on the side surface of the camera body 11, a slot 18 into which an electro-photographing recording medium 30 is inserted is formed, and an eject switch 19, which is pressed when removing the electro-photographing recording medium 30 from the slot 18, is provided close to the slot 18.

Figure 2:
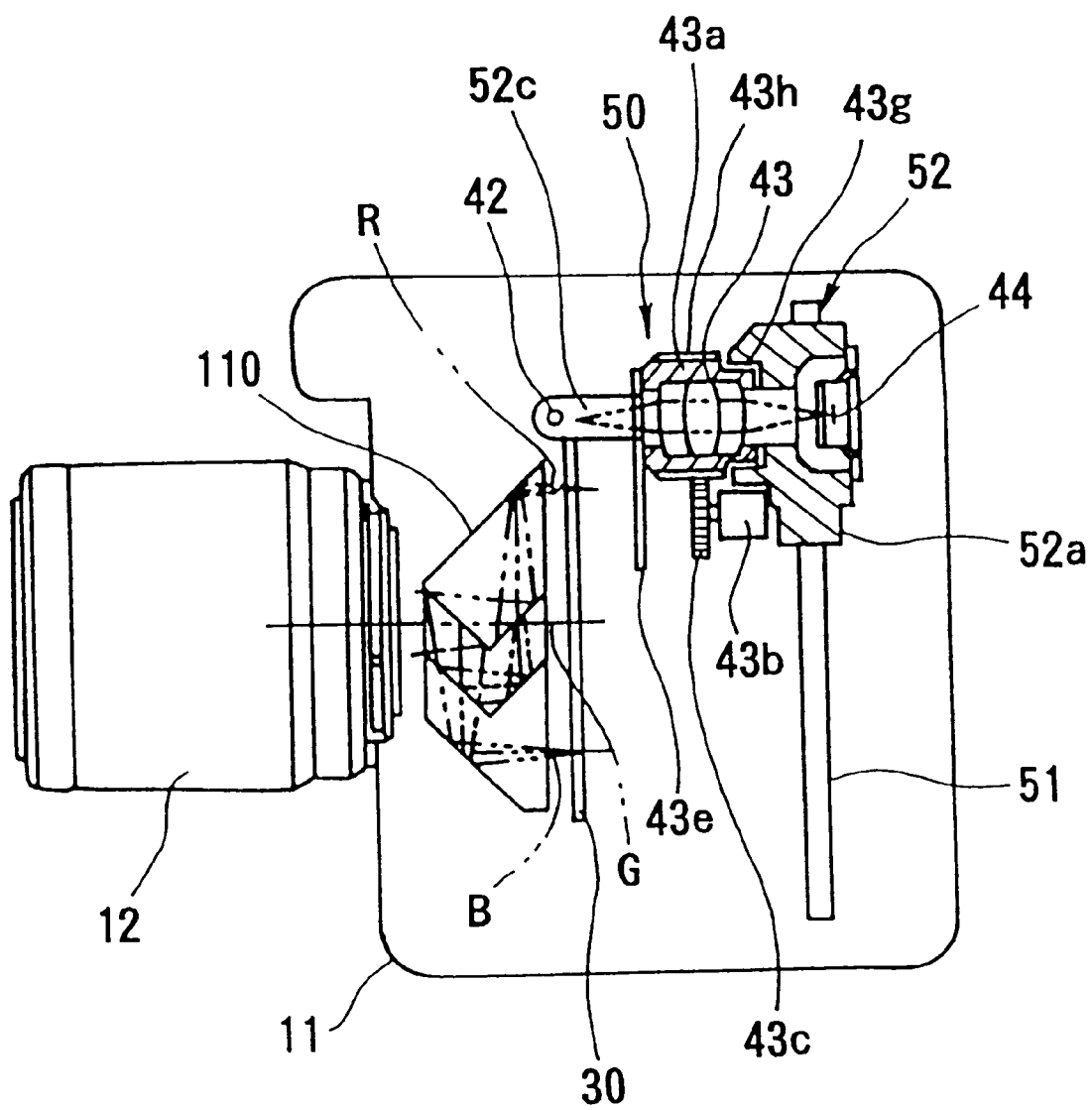
FIG. 2 is a view showing an internal structure of the still video camera, viewed from above the still video camera when an image is recorded on an electro-developing recording medium.
Figure 3:
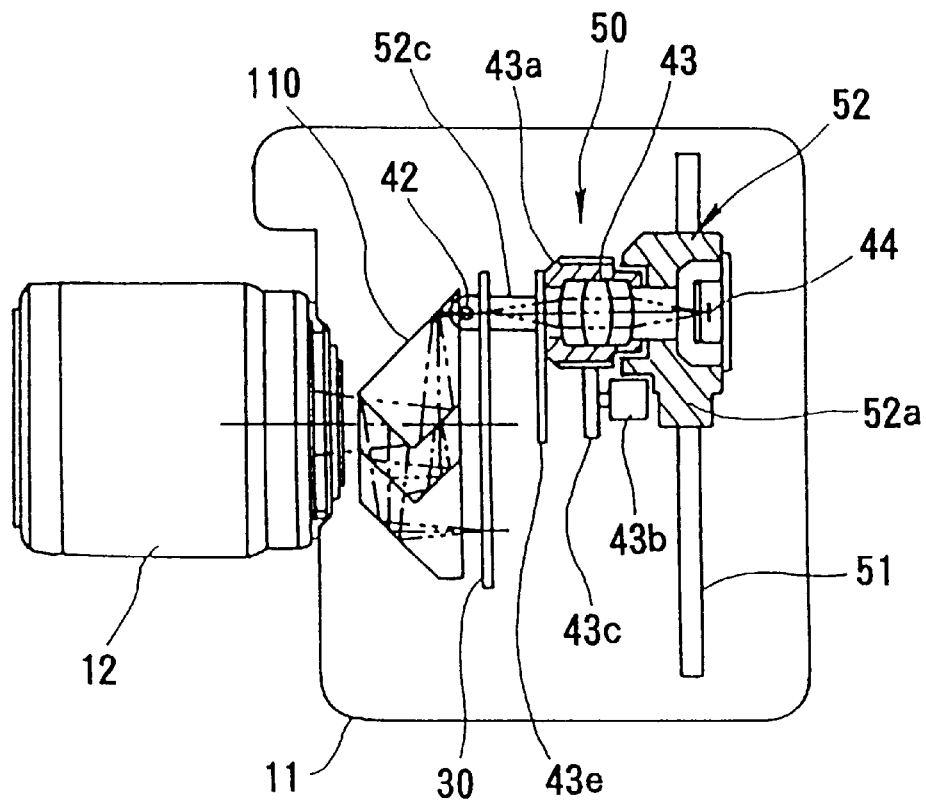
FIG. 3 is a view showing the still video camera when an image recorded on the electro-developing recording medium is read out.
Figure 4:
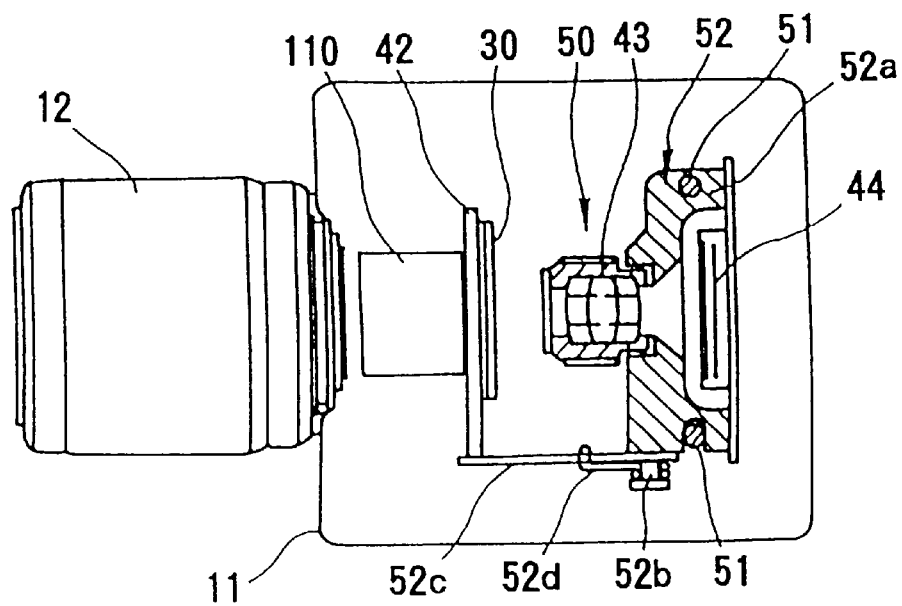
FIG. 4 is a view showing the still video camera from a side thereof, which is in the state shown in FIG. 3.

FIGS. 2 through 4 show an internal structure of the camera body 11. FIG. 2 shows a state in which an image is recorded on the electro-developing recording medium 30 by photography, and FIGS. 3 and 4 show a state in which an image recorded on the electro-developing recording medium 30 is read therefrom.

In the camera body 11, a dichroic prism 110 is provided behind the photographing optical system 12, so that a light beam passing through the photographing optical system 12 enters into the dichroic prism 110. The light beam is split into R(red), G(green) and B(blue) composing the three primary colors by the dichroic prism 110, which emerge from the dichroic prism 110. An image obtained by the photographing optical system 12 is formed on the electro-developing recording medium 30 disposed right behind the emergent plane of the dichroic prism 110. Namely, the electro-developing recording medium 30 is provided on an imaging plane (i.e., a photo imaging plane) on which the image is formed by the photographing optical system 12, and thus, R-, G- and B-images are formed on a light receiving surface of the electro-developing recording medium 30. These images are developed by the electro-developing recording medium 30 as visible images, and are read out by driving a sub-scanning mechanism 50.

The sub-scanning mechanism 50 is provided with a light source 42, i.e., an illumination optical system for illuminating the electro-developing recording medium 30. The light source 42 is attached to a moving mechanism 52 movably supported by a pair of guide shafts 51, and is positioned at a portion close to one surface of the electro-developing recording medium 30 which surface faces, or is parallel to, the emergent surface of the dichroic prism 110. The moving mechanism 52 is provided with a scanner optical system 43 and a line sensor 44 (i.e., an imaging device), which are positioned on the side of the electro-developing recording medium 30 opposite to the light source 42. The scanner optical system 43 can be positioned on an optical path of a light beam which is outputted by the light source 42 and which passes through the electro-developing recording medium 30. The line sensor 44 is an optical sensor sensing an optical image, and is provided on a sensor imaging plane on which an image is formed by the scanner optical system 43. The light source 42 is an LED (light emitting diode), and is extended in a direction normal to the plane of FIG. 2. The line sensor 44 is also extended in a direction normal to the plane of FIG. 2, and is provided parallel to the light source 42.

As described above, an object image is formed on the photo imaging plane by the photographing optical system 12, and the image formed on the photo imaging plane is formed on a light receiving surface of the line sensor 44 by the scanner optical system 43 when the scanner optical system 43 is set at an in-focus position. Namely, the image formed on the line sensor 44 by the scanner optical system 43 is an image formed on a scanning plane, which is positioned at a location in front of the scanner optical system 43, and which is located at a conjugate position to the light receiving surface of the line sensor 44 with respect to the scanner optical system 43. In this embodiment, the photo imaging plane and the scanning plane are controlled so as to be coincident with each other, by adjusting the position of the scanner optical system 43 along the optical axis thereof.

The scanner optical system 43 is mounted in a cylindrical housing 43a, an outer surface of which has gears 43g and 43h. The gear 43g is threadingly fitted in a moving body 52a of the moving mechanism 52, and the gear 43h is meshed with a gear 43c fixed to an output shaft of a motor 43b provided on the moving body 52a. Therefore, when the motor 43b is driven, the housing 43a is rotated, so that the scanner optical system 43 is displaced along the optical axis thereof.

An arm 43e is fixed to a front end surface of the housing 43a. Therefore, when the motor 43b is driven, the arm 43e is rotated and presses a support plate 52c of the moving mechanism 52, in accordance with the rotational position of the arm 43e.

In the moving mechanism 52, the moving body 52a is movably supported by the guide shafts 51, and thus the moving body 52a is movable parallel to the electro-developing recording medium 30. The support plate 52c is rotatably supported by a projection 52b provided on the moving body 52a. The light source 42 is fixed to one surface of the support plate 52c. A spring 52d is provided to connect the support plate 52c and the projection 52b. In a photographing operation shown in FIGS. 2 through 4 in which the electro-developing recording medium 30 is used, the arm 43e does not come in contact with the support plate 52c, and thus the support plate 52c is positioned so that the light source 42 faces a front surface of the scanner optical system 43. In other words, the light source 42 is positioned on the optical axis of the scanner optical system 43, similar to the line sensor 44.

When the moving mechanism 52 is moved along the guide shafts 51, the light source 42 is moved along the electro-developing recording medium 30, and the scanner optical system 43 and the line sensor 44 are moved together with the light source 42. Namely, an image formed on the electro-developing recording medium 30, on which a light beam is illuminated by the light source 42, is formed on the light receiving surface of the line sensor 44 by the scanner optical system 43, and is scanned by the line sensor 44. The line sensor 44 is moved in a direction different from a longitudinal direction thereof.

Note that, when the photographing operation takes place, the light source 42 is positioned at a portion which does not interfere with the optical path between the dichroic prism 110 and the electro-developing recording medium 30 as shown in FIG. 2.

Figure 5:
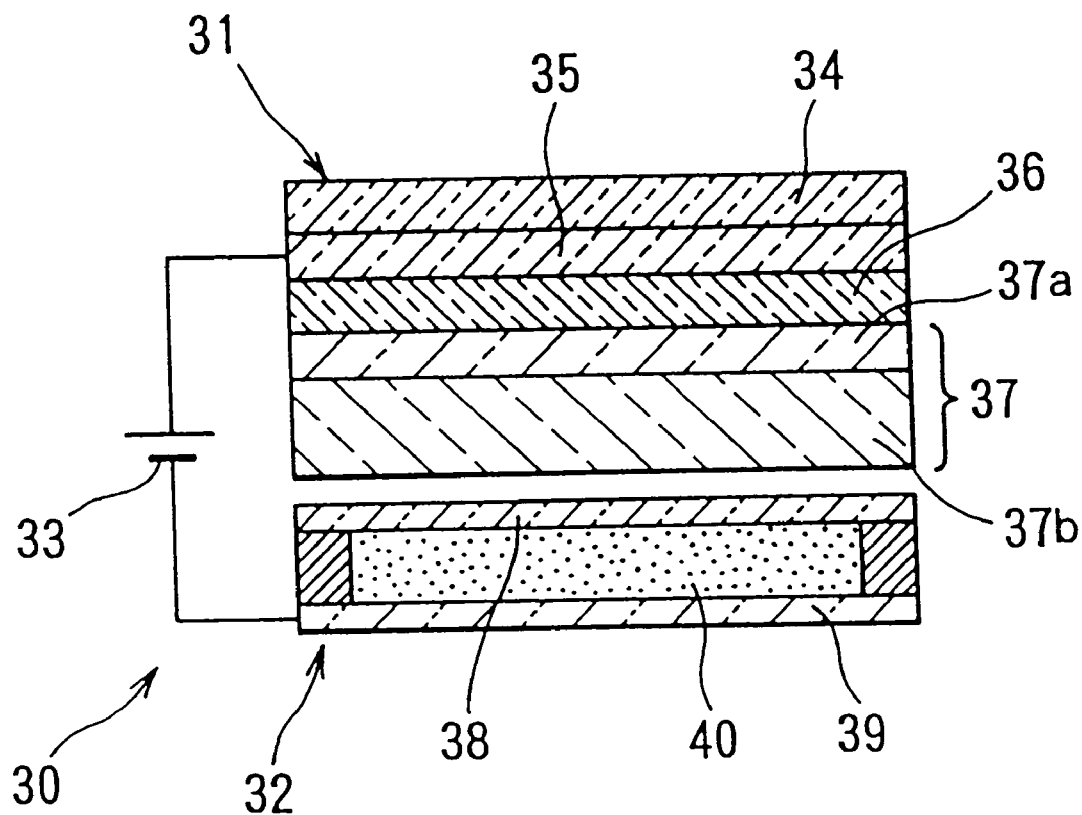
FIG. 5 is a view showing a structure of the electro-developing recording medium.

FIG. 5 shows a structure of the electro-developing recording medium 30, and is the same as that shown in Japanese Unexamined Patent Publication No. 5-2280.

The electro-developing recording medium 30 has an electrostatic information recording medium 31 and an electric charge keeping medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

Figure 12:
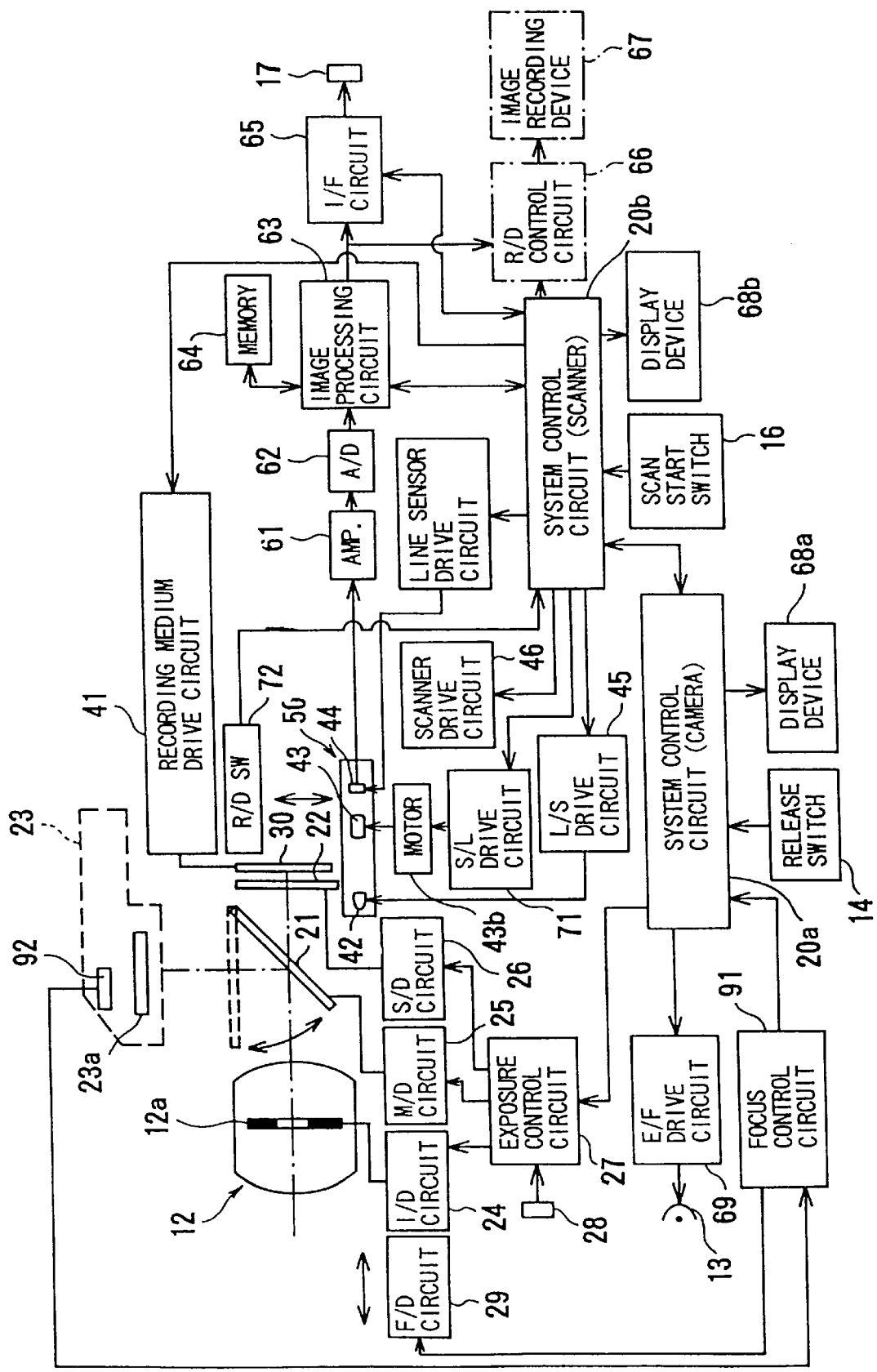
FIG. 12 is a block diagram of the still video camera.

An ON-OFF condition of the electric power source 33 is controlled by a recording medium drive circuit 41 (see FIG. 12). When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed to light while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge keeping medium 32 is a dispersion type liquid crystal display, and thus, the developed visible image is kept therein even if the electric field is removed. In the dispersion type liquid crystal display, the developed visible image can be deleted by heating the dispersion type liquid crystal display, using a heating device (not shown) at a predetermined temperature. In such a case, the same electric charge keeping medium 32 can be used repeatedly.

Figure 6:
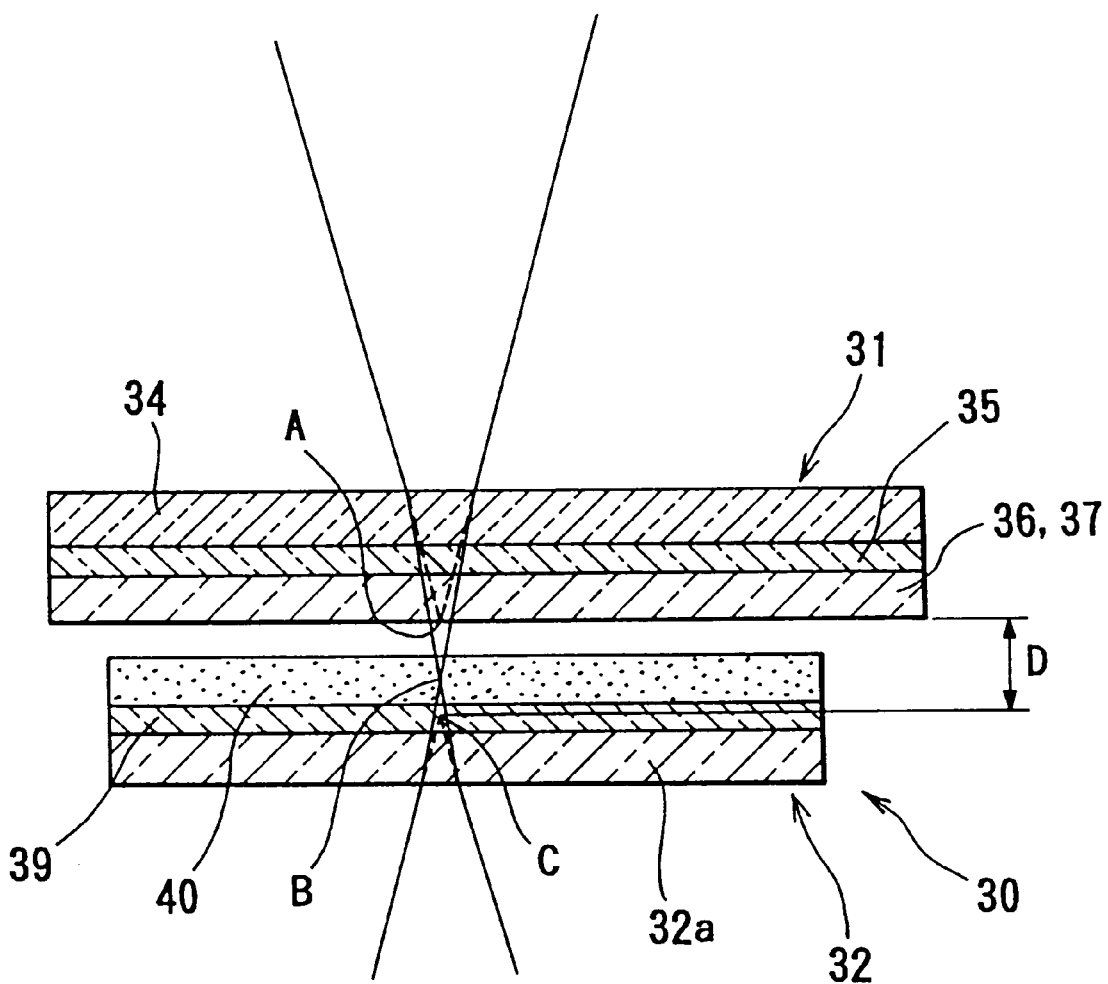
FIG. 6 is a sectional view showing an effect of the electro-developing recording medium on a light beam passing therethrough.

FIG. 6 shows an effect on the electro-developing recording medium 30 from a light beam passing therethrough. Note that, in FIG. 5, a sheet of glass 32a, provided on the under surface of the liquid crystal electrode layer 39 of the electric charge keeping medium 32, is omitted.

As shown in FIG. 6, if the electro-developing recording medium 30 was not provided, the object image led from the photographing optical system 12 (see FIGS. 2 through 4) would be formed at a point A. However, when the electro-developing recording medium 30 is provided, the object image is formed at point B due to an index of refraction of the glass base plate 34, and the other components included in the electrostatic information recording medium 31. Namely, the plane containing point B is the photo imaging plane, and is positioned in the liquid crystal 40. On the other hand, the image formed on the photo imaging plane, i.e., the liquid crystal 40, is formed on the line sensor 44 by the scanner optical system 43 (see FIGS. 2 through 4). If the electro-developing recording medium 30 was not provided, an image formed on a plane including point C would be formed on the line sensor 44 by the scanner optical system 43 since the light beam entering the scanner optical system 43 is not influenced by an index of refraction of the glass sheet 32a which would not be present, and thus the image formed on the plane containing the point C would be formed on the line sensor 44 by the scanner optical system 43. In other words, when the electro-developing recording medium 30 is not provided, the scanning plane is the plane containing the point C, and the photo imaging plane and the scanning plane are separated from each other by the distance D as shown in FIG. 6.

Thus, the electro-developing recording medium 30 is detachably mounted in a portion containing the photo imaging plane and the scanning plane. In this embodiment, as described below, the position of the scanner optical system 43 on the optical axis is adjusted when the electro-developing recording medium 30 is not provided, so that an in-focus image is formed on the line sensor 44 whether the electro-developing recording medium 30 is mounted or not.

Figure 7:
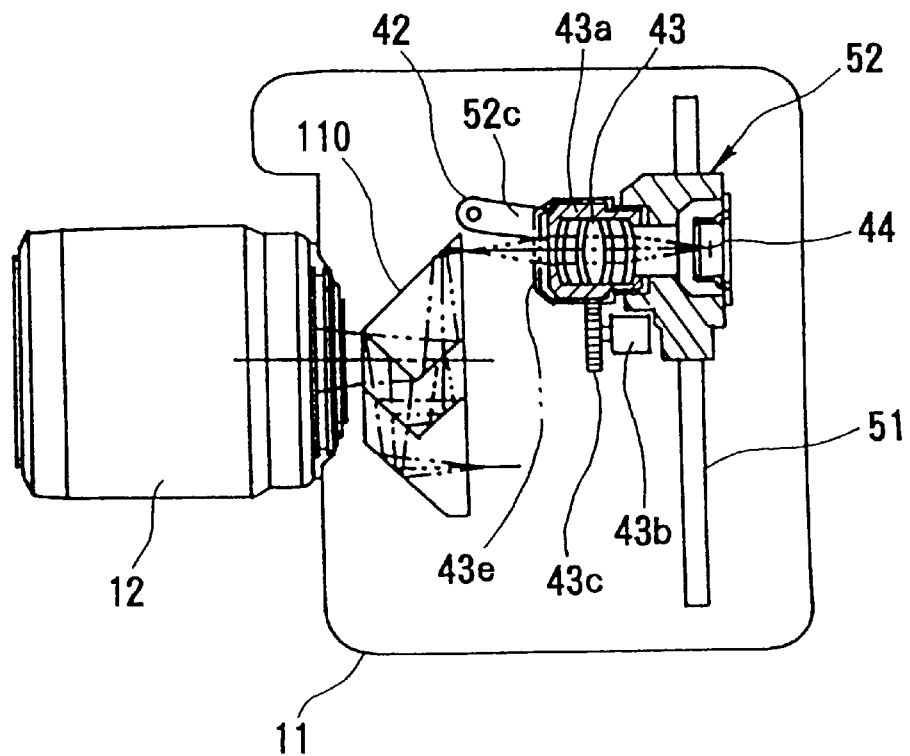
FIG. 7 is a view showing an internal structure of the still video camera, viewed from above the still video camera when an aerial image is read out.
Figure 8:
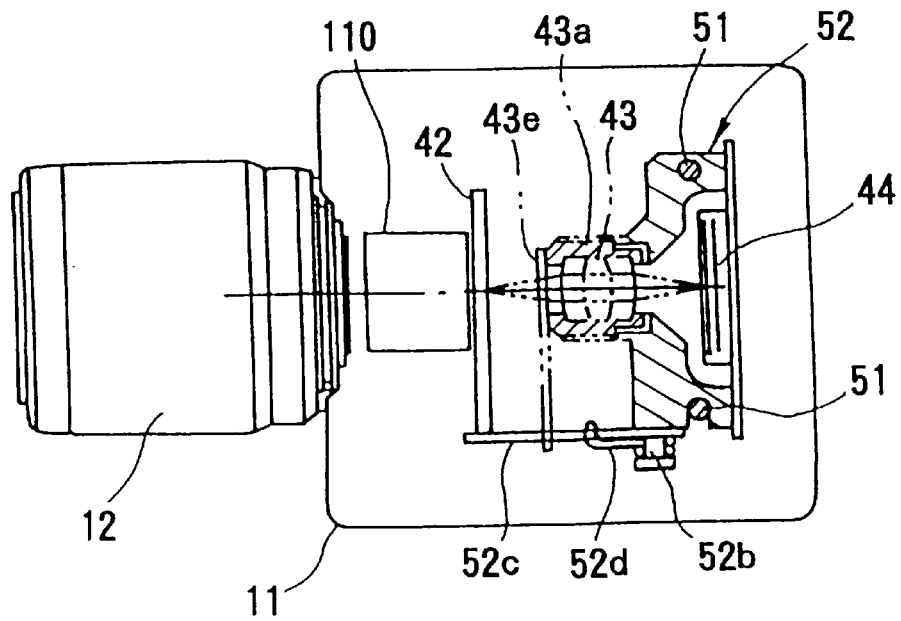
FIG. 8 is a view showing the internal structure of the still video camera, viewed from the side of the still video camera when an aerial image is read out.

FIGS. 7 and 8 show a photographing operation without the electro-developing recording medium 30, that is, an operation in which an aerial image is read out through the scanner optical system 43.

In contrast with the state in which the electro-developing recording medium 30 is provided, the output shaft of the motor 43b is rotated by a predetermined rotational angle, and thus the housing 43a is rotated through the gear 43c to move in the axial direction thereof. Namely, the scanner optical system 43 is moved toward the dichroic prism 110 along the optical axis of the scanner optical system 43, so that the scanning plane (the plane containing the point C of FIG. 6) is coincident with the photo imaging plane (the plane containing the point A of FIG. 6), and thus the image formed on the photo imaging plane by the photographing optical system 12 is formed on the line sensor 44 by the scanner optical system 43.

Further, by rotation of the housing 43a, the support plate 52c is pressed by the arm 43e, so that the support plate 52c is rotated by approximately 10 degrees, for example, against the spring 52d, and thus the light source 42 is displaced from the optical path between the dichroic prism 110 and the scanner optical system 43, i.e., the optical axis of the scanner optical system 43.

Figure 9:
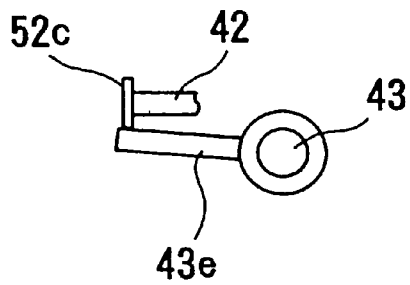
FIG. 9 is a view showing a positional relationship between a support plate and an arm when a photographing operation is performed without using the electro-developing recording medium.
Figure 10:
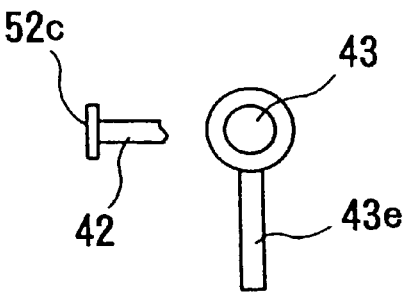
FIG. 10 is a view showing a positional relationship between a support plate and an arm when a photographing operation is performed using the electro-developing recording medium.

FIG. 9 shows a positional relationship between the support plate 52c and the arm 43e when a photographing operation is performed without using the electro-developing recording medium 30. In this state, the support plate 52c is pressed by the arm 43e, and thus the light source 42 is displaced from the optical path between the dichroic prism 110 and the scanner optical system 43. Conversely, a photographing operation using the electro-developing recording medium 30 is performed in a state in which the arm 43e is not in contact with the support plate 52c so that the light source 43 is positioned in the optical path, as shown in FIG. 10.

Figure 11:
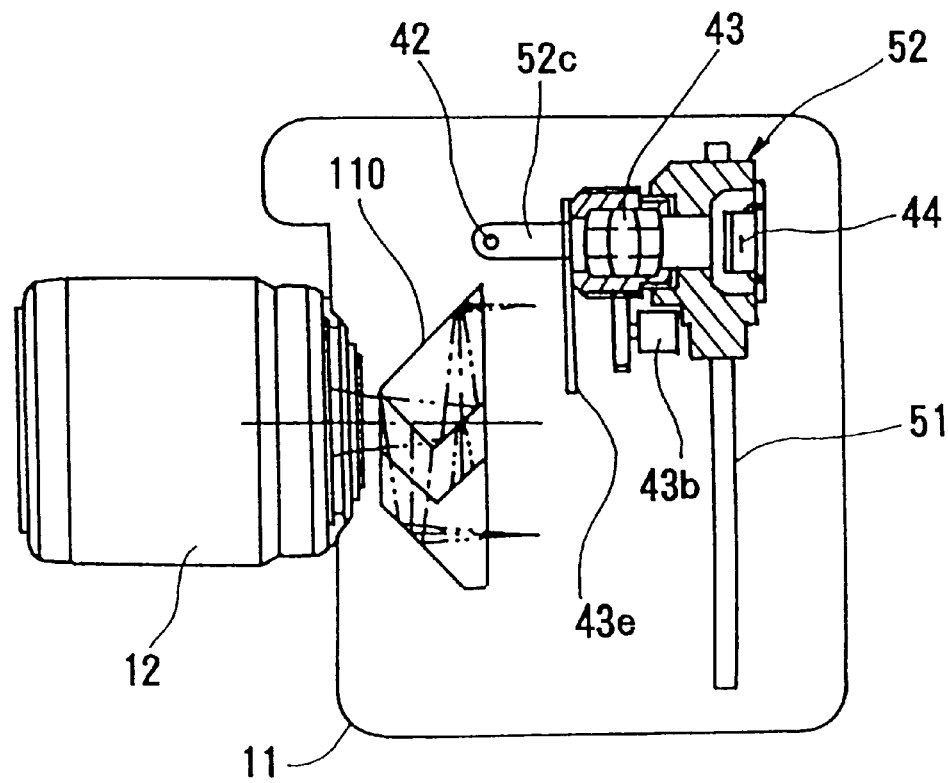
FIG. 11 is a view showing a state in which a reading operation of an aerial image has not been started.

FIG. 11 shows a state in which a reading operation of the aerial image has not been started. In this state, the scanner optical system 43 is positioned so as not to face the emergent plane of the dichroic prism 110, similar to a recording operation of the electro-developing recording medium 30 shown in FIG. 2. Also, in this state, the scanner optical system 43 is rotated back toward the moving body 52a (to the right in FIG. 11), and the support plate 52c is released from the arm 43e.

FIG. 12 is a block diagram of the still video camera.

Each of the first and second system control circuits 20a and 20b includes a micro-computer. The first system control circuit 20a controls a photographing operation performed by using the photographing optical system 12, and the second system circuit 20b controls a reading operation performed by using the scanner optical system 43.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view-finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the first system control circuit 20a. Namely, when an exposure is controlled, the opening degree of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period by the shutter drive circuit 26 under control of the exposure control circuit 27, and thus, the light beam passing through the photographing optical system 12 enters a light receiving surface of the electro-developing recording medium 30.

The lens groups included in the photographing optical system 12 are driven by a focus drive circuit 29, which is controlled by a focus control circuit 91. The focus control circuit 91 is operated in accordance with an AF signal outputted by an AF sensor 92 sensing a focusing state of the photographing optical system 12, and a signal indicating that the auto focus operation has been completed is inputted into the first system control circuit 20a.

An electric voltage is applied to the electro-developing recording medium 30 under control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the second system control circuit 20b.

The sub-scanning mechanism 50 is provided close to the electro-developing recording medium 30. The light source 42 including an LED (light emitting diode) or a fluorescent lamp, the scanner optical system 43 and the line sensor 44 are supported by the sub-scanning mechanism 50, and are moved along the electro-developing recording medium 30 by a sub-scanning operation of the sub-scanning mechanism 50.

The line sensor 44 may be a one dimensional CCD sensor of 2000 pixels, for example. The light source 42 can be moved along the front surface of the shutter 22 or the front surface of the electro-developing recording medium 30, and the line sensor 44 can be moved along the rear surface of the electro-developing recording medium 30.

ON and OFF control of the light source 42 is performed by a light source drive circuit 45. Control of the reading operation of the pixel signal generated in the line sensor 44 is carried out by a line sensor drive circuit 47. Control of the movement of the sub-scanning mechanism 50 is performed by a scanner drive circuit 46. The circuits 45, 46 and 47 are controlled by the second system control circuit 20b.

The motor 43b, which sets a position of the scanner optical system 43 on the optical axis thereof, is driven by a scanner lens drive circuit 71, which controls the motor 43b in accordance with whether or not the electro-developing recording medium 30 is mounted. Namely, a recording medium sensing switch 72 is provided close to a portion where the electro-developing recording medium 30 is mounted, and outputs a signal in accordance with the presence of the electro-developing recording medium 30. The signal outputted from the switch 72 is inputted into the second system control circuit 20b, which outputs a command signal in accordance with the presence of the electro-developing recording medium 30, to the scanner lens drive circuit 71, and thus the motor 43b is driven to perform an in-focus operation of the scanner optical system 43.

A pixel signal read out from the line sensor 44 is amplified by an amplifier 61, and converted to a digital signal by an A/D converter 62. The digital pixel signal is subjected to a shading correction, a dropout correction, a gamma correction and so on by an image processing circuit 63 under control of the second system control circuit 20b, and then, is temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame's worth of image signals.

The pixel signal outputted from the memory 64 is inputted into an interface circuit 65 through the image process circuit 63, so that the pixel signal is subjected to a prederemined process such as a format conversion, and can be outputted to an external display device (not shown) through the output terminal 17. The pixel signal outputted from the image process circuit 63 is subjected to a predetermined process such as an image compression and a format conversion in a recording device control circuit 66, so that the pixel signal can be recorded on a recording medium such as an IC memory card, for example, in an image recording device 67. The interface circuit 65 and the recording device control circuit 66 are operated in accordance with a command signal outputted from the second system control circuit 20b.

The release switch 14 is connected to the first system control circuit 20a, and a photography operation is carried out in accordance with an operation of the switch 14. A display device 68a for indicating various setting conditions of the still video camera, and an electronic flash drive circuit 69 for performing a flash control of the electronic flash 13 are also connected to the first system control circuit 20a.

The scan start switch 16 is connected to the second system control circuit 20b, and a reading operation of an image signal is carried out in accordance with an operation of the switch 16. A display device 68b for indicating various setting conditions of the scanner optical system 43 is also connected to the second system control circuit 20b.

An operation of this embodiment will be described below.

When an object image is developed by the electro-developing medium 30, the moving mechanism 52 is moved away to a portion where the scanner optical system 43 does not face the electro-developing recording medium 30, as shown in FIG. 2. In this state, when the release switch 14 (see FIG. 1) is depressed, the image is developed in the liquid crystal 40 (FIG. 5) of the electro-developing recording medium 30. Then, when the scan start switch 16 is depressed, a reading operation, in which the image is read out from the electro-developing medium 30 by the line sensor 44, is started. Namely, the moving mechanism 52 is positioned at a portion where the scanner optical system 43 faces the electro-developing recording medium 30, as shown in FIGS. 3 and 4, and is moved along the electro-developing recording medium 30, so that a sub-scanning operation of the line sensor 44 is performed. In this operation, the image data is read out from the electro-developing recording medium 30 through the line sensor 44, and is outputted to the image recording device 67, for example. In the photographing and reading operations described above, the scanner optical system 43 is positioned at a predetermined in-focus position by an operation of the recording medium sensing switch 72.

When the object image is outputted to the image recording device 67, for example, by not using the electro-developing recording medium 30, based on a signal outputted-from the recording medium sensing switch 72, the motor 43b is driven, and the scanner optical system 43 is moved toward the dichroic prism 110 in comparison with a state in which the electro-developing recording medium 30 is mounted. Further, the light source 42 is set at a postion where the light source 42 is displaced from the front surface of the scanner optical system 43. In this state, if the scan start switch 16 is depressed, the moving mechanism 52 is moved along the dichroic prism 110, so that a sub-scanning by the line sensor 44 is performed, and thus the image data is read out, and is outputted to the image recording device 67.

As described above, the first embodiment is constructed in such a manner that, in accordance with the presence of the electro-developing recording medium 30, the position of the scanner optical system 43 on the optical axis thereof is controlled, and the photo imaging plane of the photographing optical system 43 and the scanning plane of the scanner optical system 43 are coincident with each other. Therefore, even if the photo imaging plane of the photographing optical system 12 is changed due to the existence of the electro-developing recording medium 30, an in-focus image is always formed on the line sensor 44, so that a clear image is obtained.

Further, when the image formed by the photographing optical system 12 is read out by the line sensor 44 in a state in which the electro-developing recording medium 30 is not mounted, the support plate 52c is pressed by the arm 43e, and thus the light source 42 is displaced from a portion in front of the scanner optical system 43. Therefore, the aerial image is normally sensed without being influenced by the light source 42.

FIGS. 13 through 21 show a second embodiment of the present invention. In the second embodiment, the dichroic prism is not provided.

Figure 13:
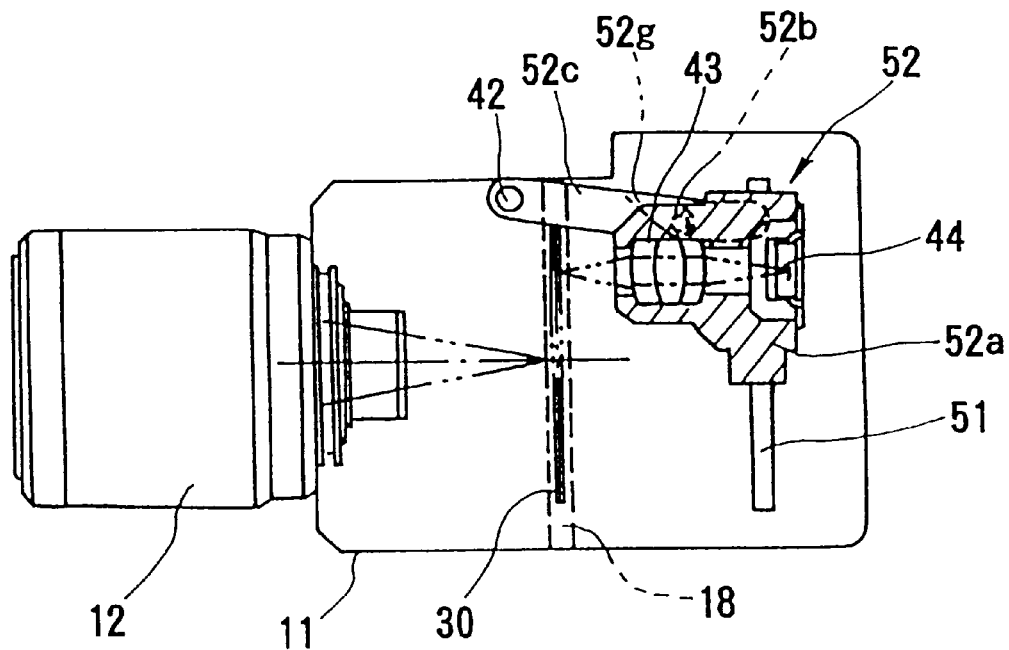
FIG. 13 is a view showing an internal structure of the still video camera, viewed from above the still video camera in a photographing operation using the electro-developing recording medium, in a second embodiment.
Figure 14:
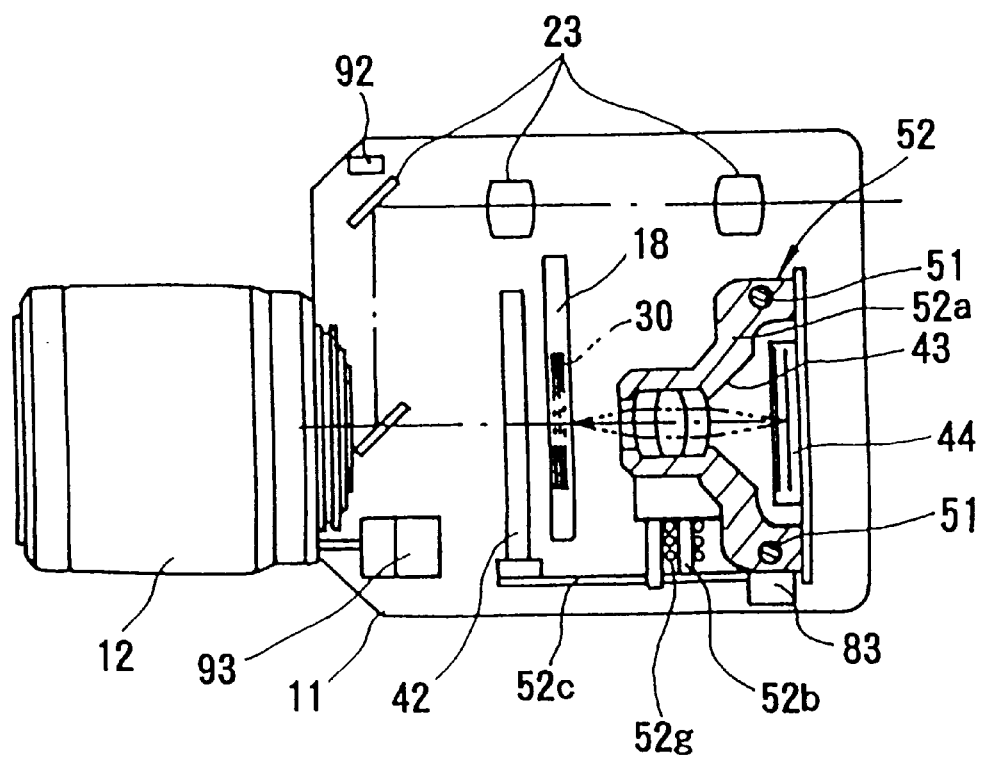
FIG. 14 is a view showing the internal structure of the still video camera, viewed from the side of the still video camera in the same state as FIG. 13.
Figure 15:
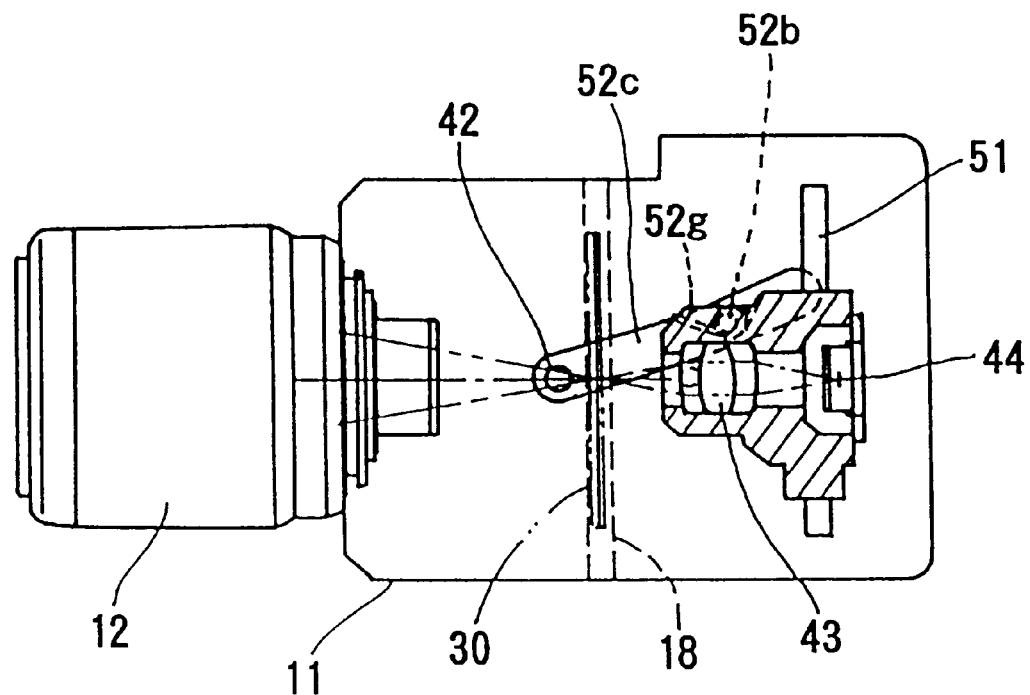
FIG. 15 is a view showing the internal structure of the still video camera, viewed from above the still video camera in a reading operation of an image from the electro-developing recording medium.

FIGS. 13 and 14 show a photographing operation using the electro-developing recording medium 30, and FIG. 15 shows a reading operation of the image developed in the liquid crystal 40 (see FIG. 5) of the electro-developing recording medium 30.

In the second embodiment, the scanner optical system 43 is directly attached to the moving body 52a of the moving mechanism 52, and is not moved in the optical axis direction thereof.

Figure 16:
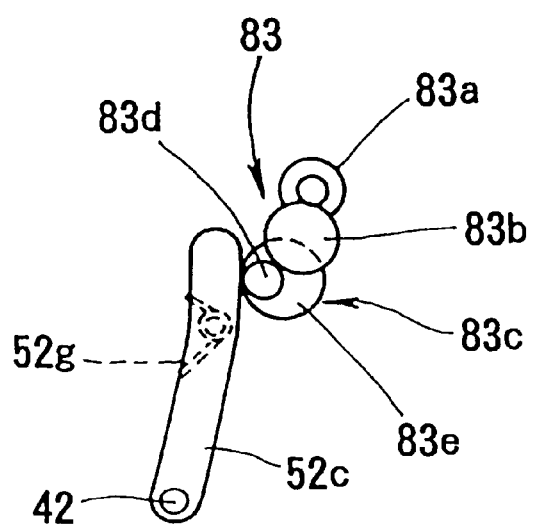
FIG. 16 is a plan view showing a mechanism for rotating a support plate, and showing a state of the mechanism, except when an image recorded in the electro-developing recording medium is read out therefrom.

The support plate 52c is rotatably supported by the projection 52b provided on the moving body 52a of the moving mechanism 52, and the spring 52g is provided to connect the support plate 52c and the projection 52b. A lamp rotation mechanism 83 shown in FIG. 16 is provided on the moving body 52a. The lamp rotation mechanism 83 has a motor 83a, a reduction gear 83b and a cam 83c. The reduction gear 83b meshes with an output shaft of the motor 83a and a rotational shaft 83d of the cam 83c, and the cam is engaged with the support plate 52c.

Figure 17:
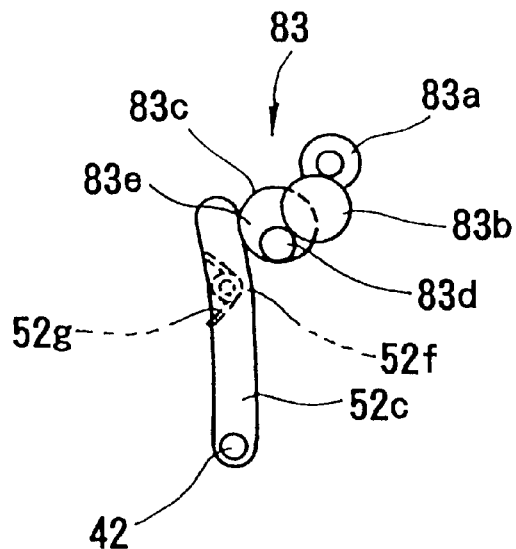
FIG. 17 is a plan view showing the mechanism for rotating a support plate, and showing a state of the mechanism, when an image recorded in the electro-developing recording medium is read out therefrom.

When a photographing operation is performed, the moving mechanism 52 is positioned at an end portion of each of the guide shafts 51, as shown in FIG. 13. In this state, a projecting portion 83e of the cam 83c is not engaged with the support plate 52c as shown in FIG. 16, and thus the support plate 52c is set to a state in which the light source 42 is displaced from the optical axis of the scanner optical system 43. Further, in the photographing operation, the focusing state of the photographing optical system 12 is controlled by the AF motor 93 driven in accordance with a signal outputted from the AF sensor 92. When an image recorded in the electro-developing recording medium 30 is read out therefrom, the projecting portion 83e of the cam 83c is engaged with the support plate 52c as shown in FIG. 17, and thus the support plate 52c is set to a state in which the light source 42 is positioned on the optical axis of the scanner optical system 43.

Figure 18:
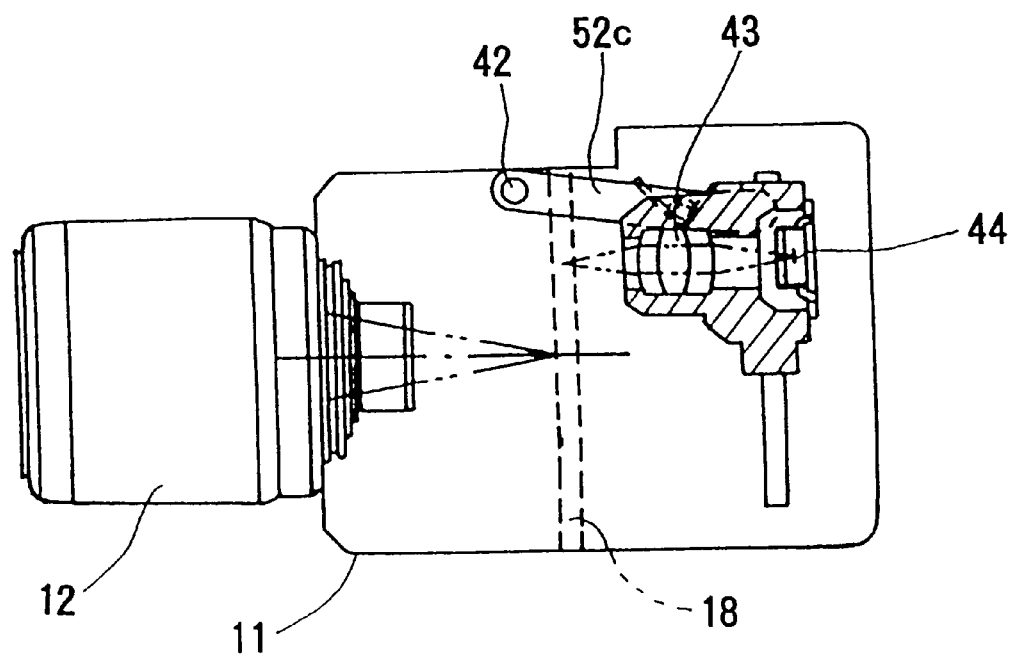
FIG. 18 is a view showing an internal structure of the still video camera, viewed from above the still video camera in an initial condition of a photographing operation in which the electro-developing recording medium is not used.
Figure 19:
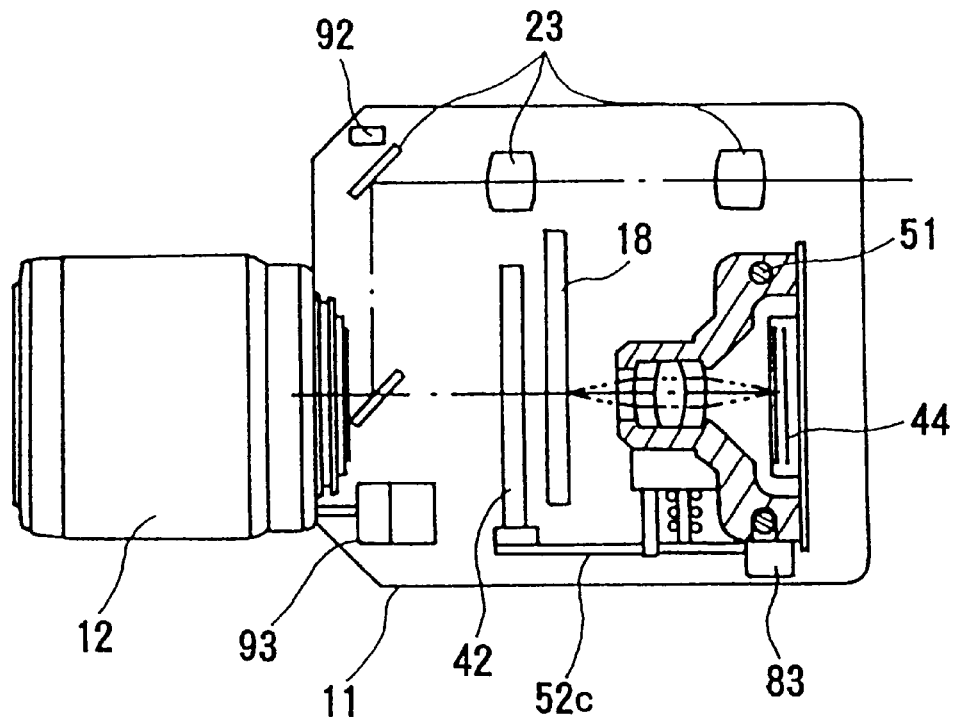
FIG. 19 is a view showing an internal structure of the still video camera, viewed from the side of the still video camera in the same state as FIG. 18.
Figure 20:
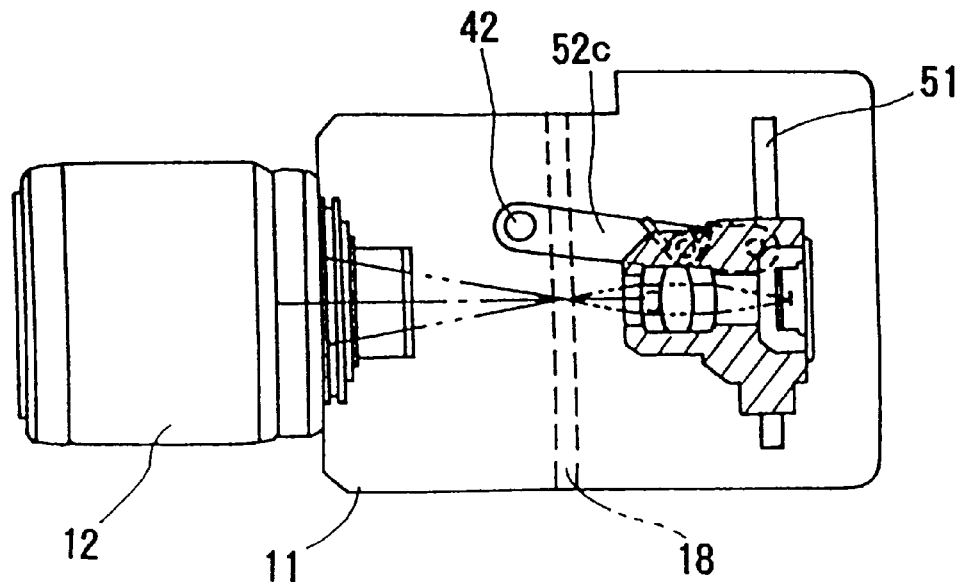
FIG. 20 is a view showing an internal structure of the still video camera, viewed from above the still video camera in a midway condition of the photographing operation in which the electro-developing recording medium is not used.

FIGS. 18 through 20 show a photographing operation in which the electro-developing recording medium 30 is not used, that is, in which an aerial image is formed. FIG. 18 shows an initial condition of the photographing operation, and FIG. 20 shows a midway condition of the photographing operation. FIGS. 18 and 19 are the same as FIGS. 13 and 14 except that the electro-developing recording medium 30 is not mounted.

In the photographing operation in which the electro-developing recording medium 30 is not used, the projecting portion 83e of the cam 83c is not engaged with the support plate 52c as shown in FIG. 16, and thus the light source 42 is displaced from the optical axis of the scanner optical system 42. A movement of the moving mechanism 52 along the guide shafts 51 (FIG. 20) causes an image formed on the scanning plane to be formed, by the scanner optical system 43, on a plane on which the line sensor 44 scans. At this time, the focusing condition of the photographing optical system 12 is controlled by the AF motor 93 driven in accordance with an output signal of the AF sensor 92.

Thus, in the second embodiment, depending upon whether the electro-developing recording medium 30 is provided or not, the positioning of the photographing optical system 12 on the optical axis thereof is carried out, so that the photo imaging plane and the scanning plane are coincident with each other. Further, when an aerial image is read out, the light source 42 is displaced from the optical axis of the scanner optical system 43, by an operation of the lamp rotation mechanism 83. The other operations are the same as those of the first embodiment.

Figure 21:
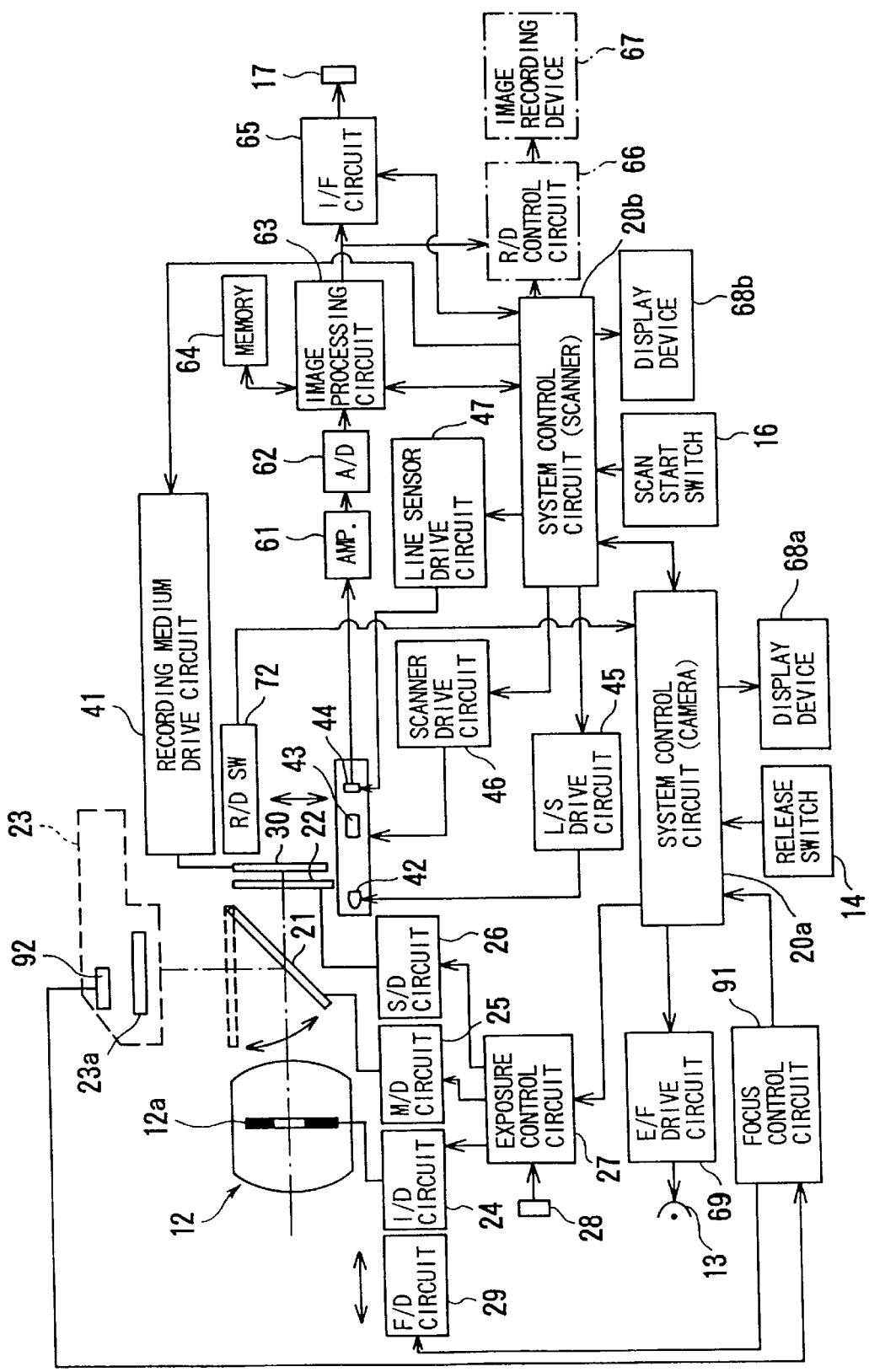
FIG. 21 is a block diagram showing a control circuit of the still video camera of the second embodiment.

FIG. 21 is a block diagram showing a control circuit of the still video camera of the second embodiment. In comparison with the control circuit of the first embodiment, in the second embodiment, the motor 43b and the scanner lens drive circuit 71, which are provided to drive the scanner optical system 43, are not provided. The other constructions are the same as those of the first embodiment.

Note that, according to the first and second embodiments, an electric charge accumulation time of the line sensor 44 can be changed, in accordance with output signals of the recording medium sensing switch 72, through the line sensor drive circuit 47. Namely, since the brightness of the image formed on the line sensor 44 varies in accordance with the presence or absence of the electro-developing recording medium 30, it is preferable that the exposure operation is controlled so that an image having a proper brightness is obtained.

Figure 22:
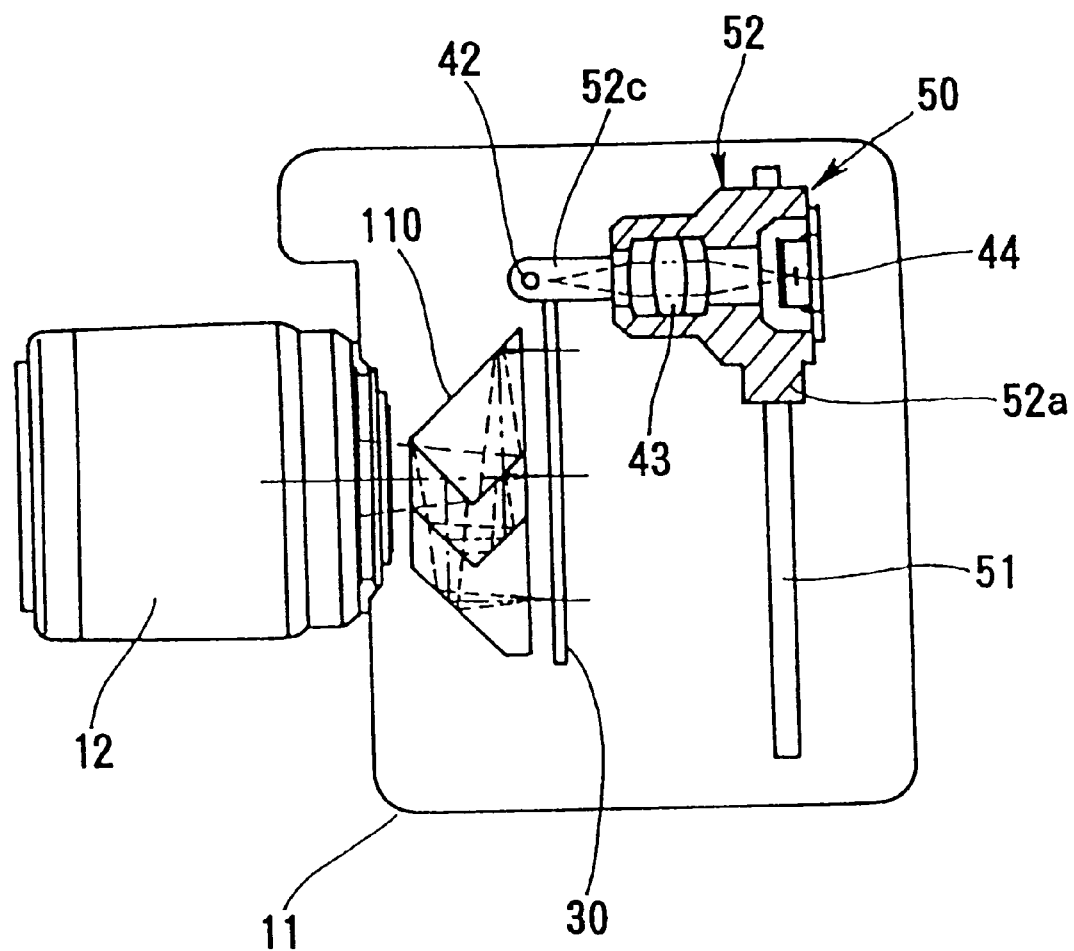
FIG. 22 is a view showing an internal structure of the still video camera, viewed from above the still video camera in a photographing operation recording an image in the electro-developing recording medium, in a third embodiment.
Figure 23:
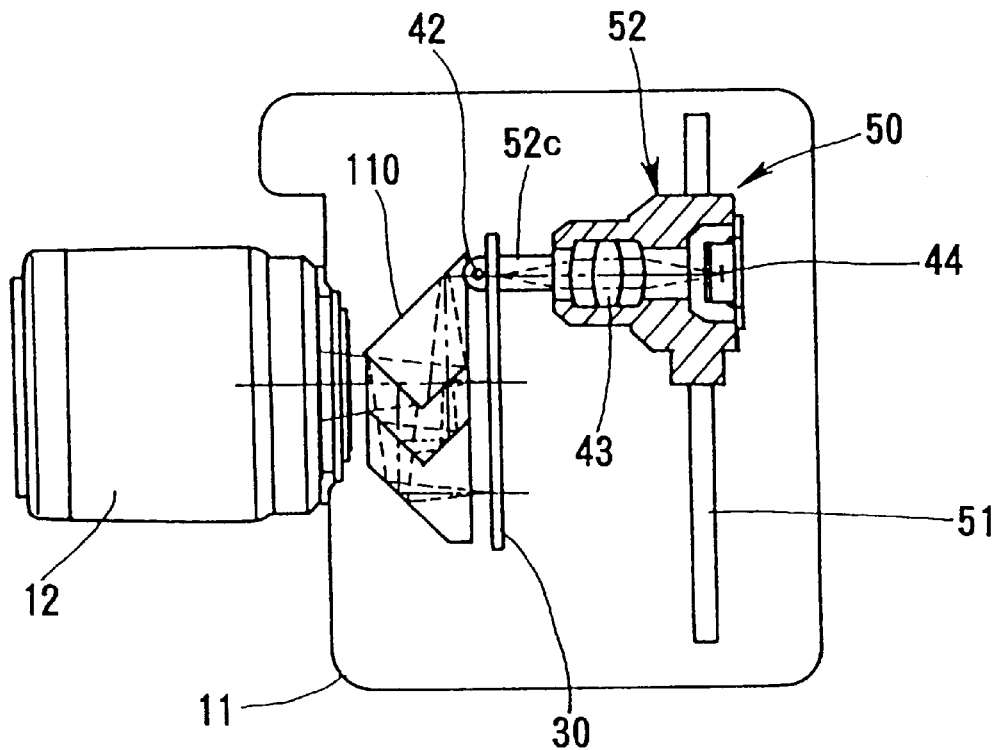
FIG. 23 is a view showing the internal structure of the still video camera, in which an image recorded in the electro-developing recording medium is read out.
Figure 24:
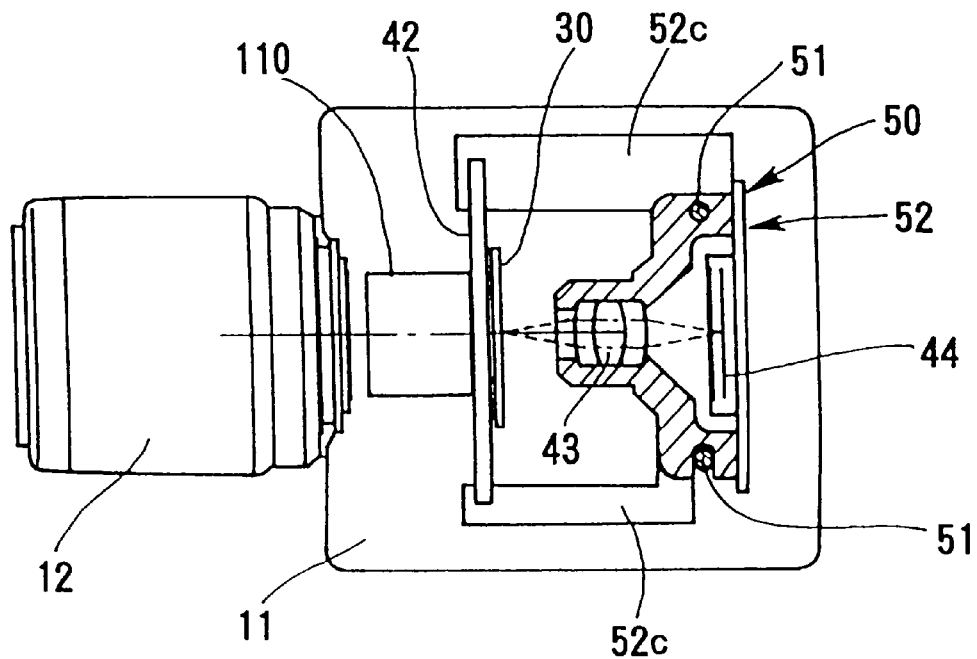
FIG. 24 is a view showing the internal structure of the still video camera shown in FIG. 23, viewed from the side of the camera.

FIGS. 22 through 24 show a mechanical structure of a third embodiment of the present invention. FIGS. 22 shows a photographing operation in which an image is recorded in the electro-developing recording medium 30, and FIGS. 23 and 24 show a reading operation in which the image recorded in the electro-developing recording medium 30 is read out.

In the third embodiment, the scanner optical system 43 is not moved in the optical axis direction, similar to the second embodiment. However, the support plate 52c is rigidly fixed to the moving body 52a and the dichroic prism 110 is provided between the photographing optical system 12 and the electro-developing recording medium 30, which structures are different from the second embodiment. Namely, the light source 42 and the scanner optical system 43 are fixed to the moving mechanism 52, and thus the light source 42 moves with the scanner optical system 43. The light source 42 is placed on the optical axis of the scanner optical system 43.

Figure 25:
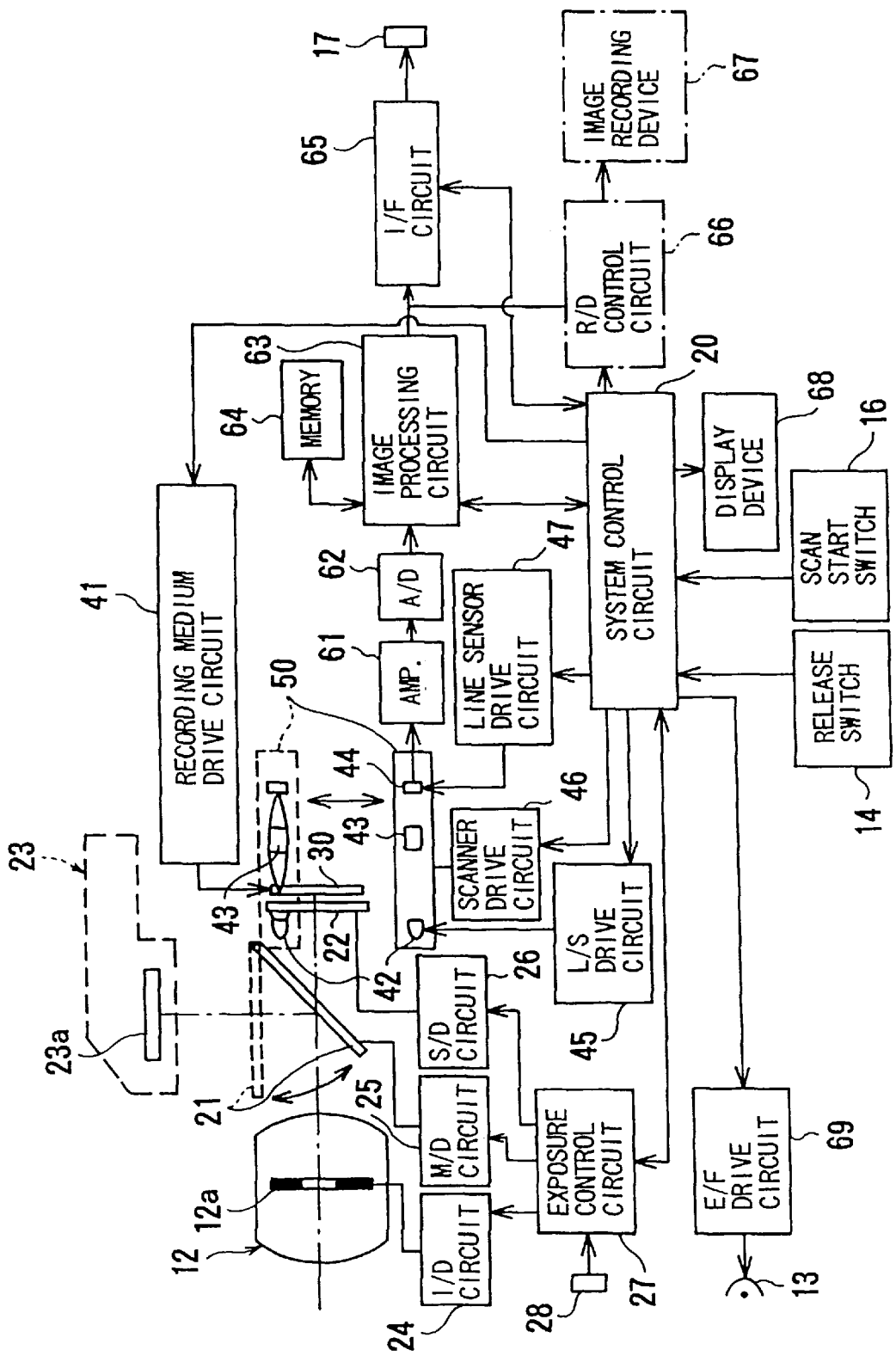
FIG. 25 is a block diagram showing a control circuit of the still video camera of the third embodiment.

FIG. 25 is a block diagram of the still video camera of the third embodiment. The construction of the third embodiment is basically the same as that of the second embodiment shown in FIG. 21. Namely, the AF sensor 92, the focus control circuit 91 and the focus drive circuit 29 are not shown in FIG. 25, but these components may be provided in the third embodiment. Although the system control circuit 20 is not split into the first and second system control circuits 20a and 20b as in the second embodiment, and the display device 68 is a single component connected to the system control circuit 20, the constructions of the system control circuit 20 and the display device 68 are basically the same as those of the second embodiment. However, in the third embodiment, the recording medium sensing switch 72 is not provided.

In the third embodiment, when an object image is formed by the photographing optical system 12 onto the electro-developing recording medium 30 and is developed thereby, the moving mechanism 52 is retreated to a position where the light source 42 and the scanner optical system 43 do not face the electro-developing recording medium 30 (i.e., a position where the light source 42 and the scanner optical system 43 are offset from an optical path of the photographing optical system 12). In this state, if the release switch 14 is depressed, the image is developed in the liquid crystal 40 (see FIG. 5 of the first embodiment) of the electro-developing recording medium 30. In this photographing operation, the light source 42 does not face the electro-developing recording medium 30. Namely, the light source 42 is offset from the optical path between the dichroic prism 110 and the electro-developing recording medium 30, and thus an eclipse (or vignetting) does not occur on the electro-developing recording medium 30. Further, since the scanner optical system 43 does not face the electro-developing recording medium 30, a light beam reflected by the lens provided at the front of the scanner optical system 43 has very little influence on the electro-developing recording medium 30, and thus an image having a high quality is obtained.

When the scan start switch 16 is depressed, a sub-scanning operation is performed. Namely, the image formed on the electro-developing recording medium 30 is read out by the line sensor 44, and is recorded on a recording medium such as an IC card through the image recording device 67. In this operation, the light source 42, the scanner optical system 43 and the line sensor 44 are moved parallel to the electro-developing recording medium 30, and the scanner optical system 44 is placed in an optical path of a light beam which is outputted by the light source 42 and which passes through the electro-developing recording medium 30.

Figure 26:
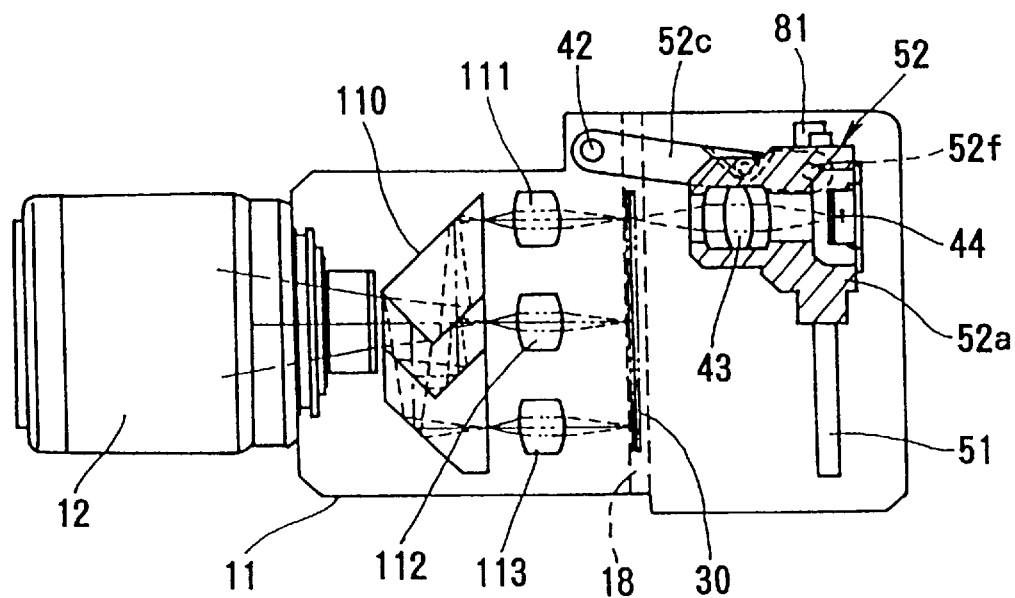
FIG. 26 is a view showing an internal structure of the still video camera, viewed from above the still video camera in a photographing operation recording an image in the electro-developing recording medium, in a fourth embodiment.
Figure 27:
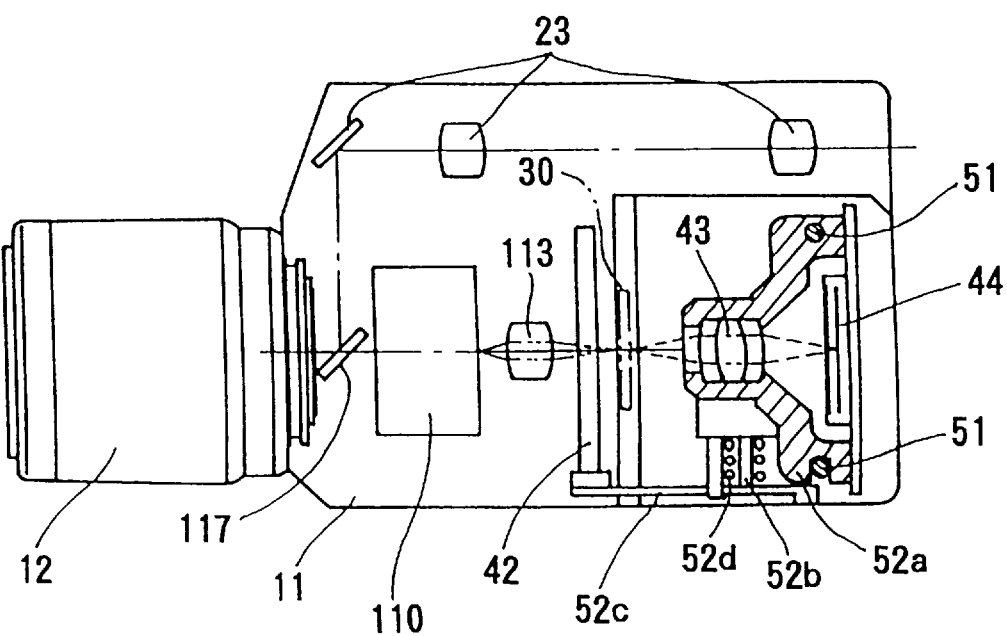
FIG. 27 is a view showing the internal structure of the still video camera shown in FIG. 26, viewed from the side of the camera.
Figure 28:
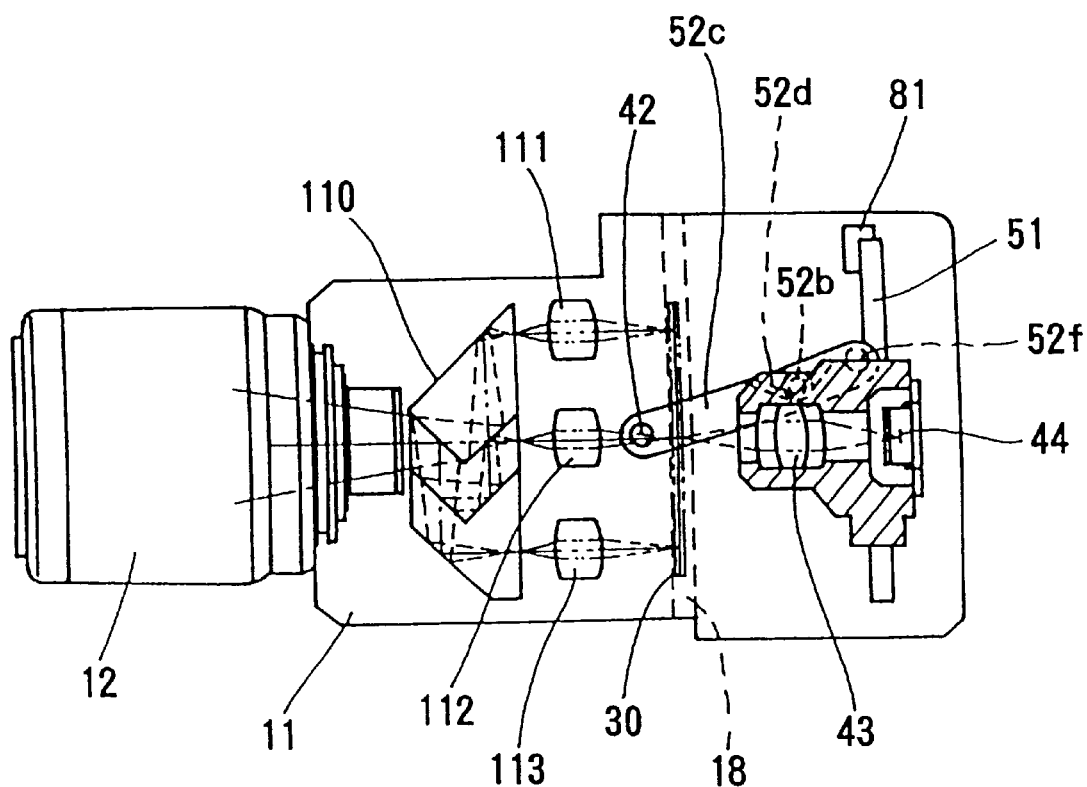
FIG. 28 is a view showing the internal structure of the still video camera, in which an image recorded in the electro-developing recording medium is read out.

FIGS. 26 through 28 show a fourth embodiment of the present invention. In this embodiment, three relay lenses 111, 112 and 113 are provide to face the emergent plane of the dichroic prism 110. Namely, an image obtained through the photographing optical system 12 is split into three imges, which are formed on a photo imaging plane close to the emergent plane of the dichroic prism 110. The three images are again formed on the electro-developing recording medium 30 through the relay lenses 111, 112 and 113.

The support plate 52c is rotatably attached to the projection 52b formed on the moving body 52a, and the spring 52d is provided to connect the support plate 52c and the projection 52b. A pin 52f is provided on the opposite side to the light source 42 on the support plate 52c, and can come in contact with a contact member 81 provided on a portion close to an end of one of the guide shafts 51. Namely, when the moving mechanism 52 is positioned at an end of the guide shafts 51, the pin 52f comes into contact with the contact member 81, and thus the support plate 52c is rotated against the spring 52d.

As shown in FIG. 27, a mirror 117 is located between the photographing optical system 12 and the dichroic prism 110, and an object image reflected by the mirror 117 is led to the view-finder optical system 23.

An operation of the fourth embodiment is described below.

When a photographing operation is performed using the electro-developing recording medium 30 as shown in FIG. 26, the moving body 52a of the moving mechanism 52 is positioned at the end of the guide shafts 51, so that the pin 52f is in contact with the contact member 81. Namely, the support plate 52c is rotated, so that the light source 42 is retreated to a position where the light source 42 offsets from the optical path between the relay lens 111 and the scanner optical system 43, i.e., where the light source 42 does not face the electro-developing recording medium 30 and the scanner optical system 43. In other words, the light source 42 is retreated to a position where the light source 42 offsets from the optical path of the photographing optical system 12 and the optical path of the scanning optical system 43. Therefore, similar to the third embodiment, an eclipse does not occur on the electro-developing recording medium 30.

Further, according to the fourth embodiment, since the support member 52c is rotated about the projection 52b, the moving range in which the moving mechanism 52 is moved can be reduced, and thus the size of the camera body 11 (i.e., a dimension thereof in the direction of the axis of the guide shafts 51) can be reduced, in comparison with the third embodiment.

On the other hand, when the image formed on the electro-developing recording medium 30 is read out, the moving mechanism 52 is moved parallel to the electro-developing recording medium 30 as shown in FIG. 28. Namely, since the moving mechanism 52 leaves the end of the guide shaft 51, the pin 52f is released from the contact member 81, and thus the support plate 52c is rotated by a spring force of the spring 52d, so that the light source 42 is positioned onto the optical axis of the scanner optical system 43. In this state, the light source 42, the scanner optical system 43 and the line sensor 44 are moved along the electro-developing recording medium 30, so that a sub-scan is carried out to read out the image formed on the electro-developing recording medium 30.

Figure 29:
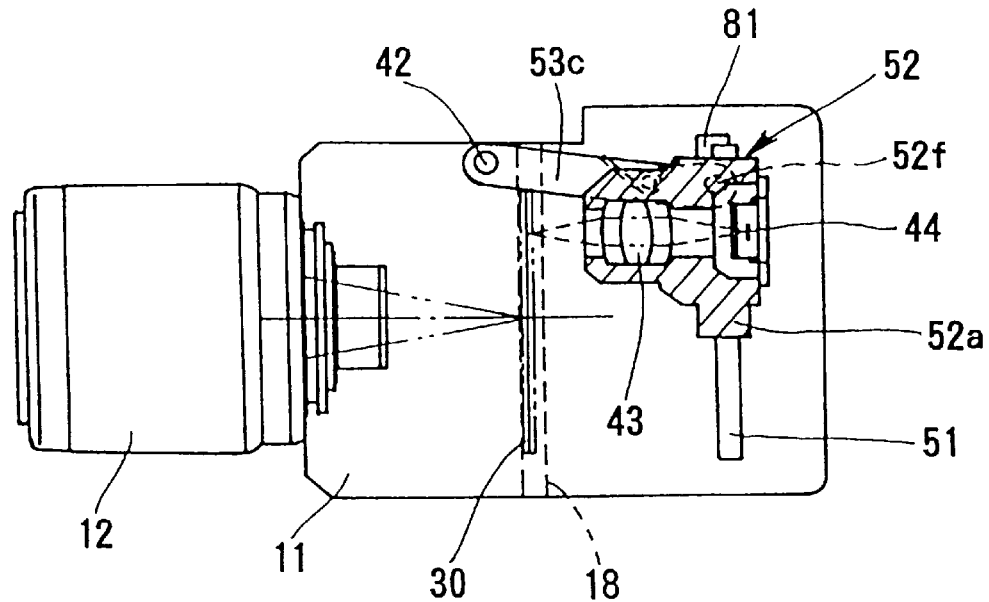
FIG. 29 is a view showing an internal structure of the still video camera, viewed from above the still video camera in a photographing operation onto the electro-developing recording medium, in a fifth embodiment.
Figure 30:
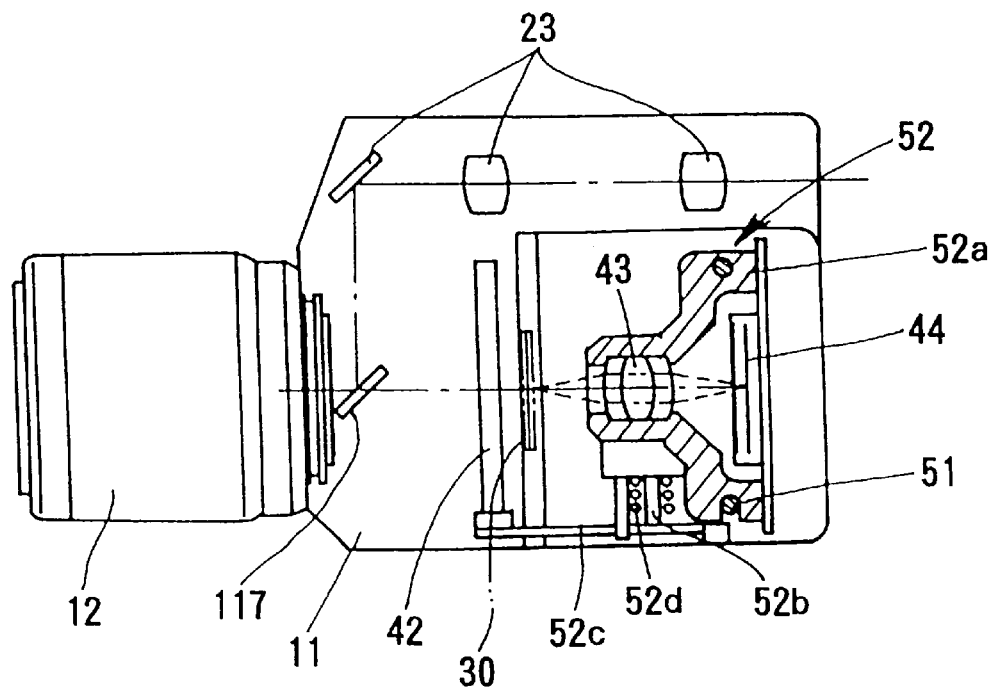
FIG. 30 is a view showing the internal structure of the still video camera shown in FIG. 29, viewed from the side of the camera.
Figure 31:
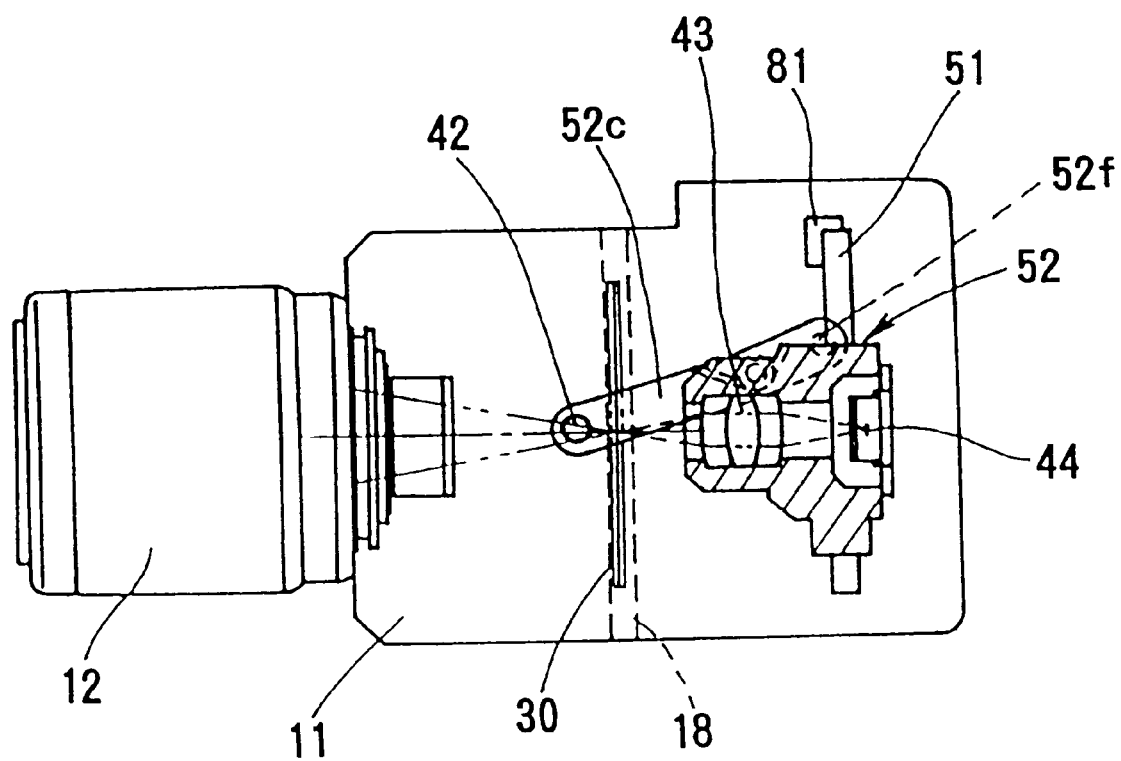
FIG. 31 is a view showing the internal structure of the still video camera, in which an image recorded in the electro-developing recording medium is read out.

FIGS. 29 through 31 show a fifth embodiment of the present invention. In this embodiment, the dichroic prism and the relay lenses are not provided, which construction is different from the fourth embodiment. Other constructions and the operation of the fifth embodiment are the same as those of the fourth embodiment.

Figure 32:
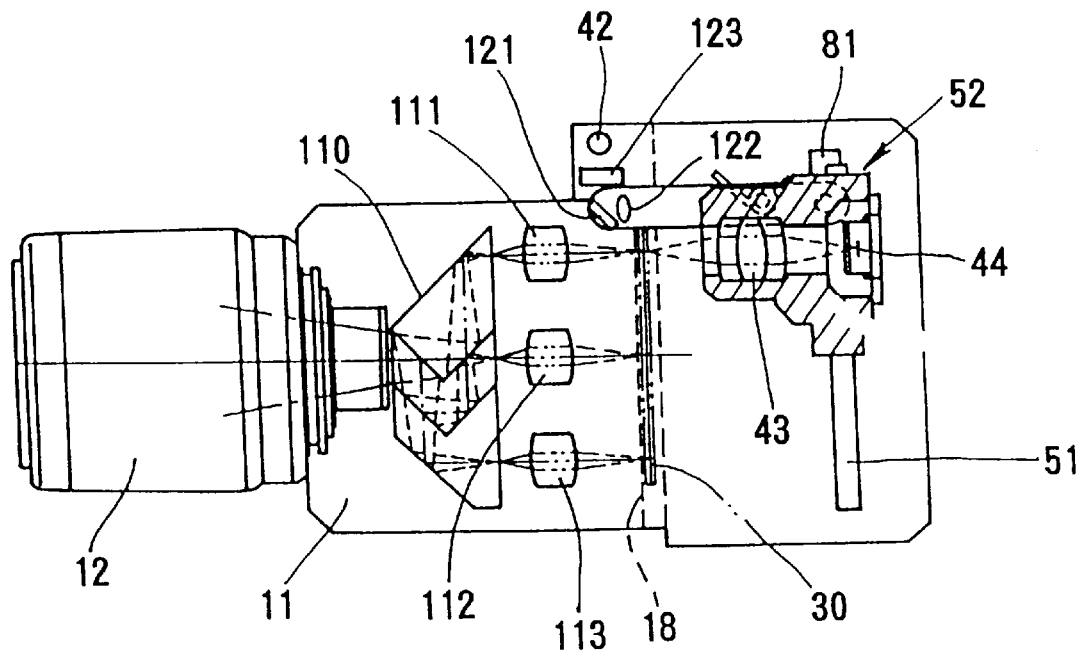
FIG. 32 is a view showing an internal structure of the still video camera, viewed from above the still video camera in a photographing operation recording an image in the electro-developing recording medium, in a sixth embodiment.
Figure 33:
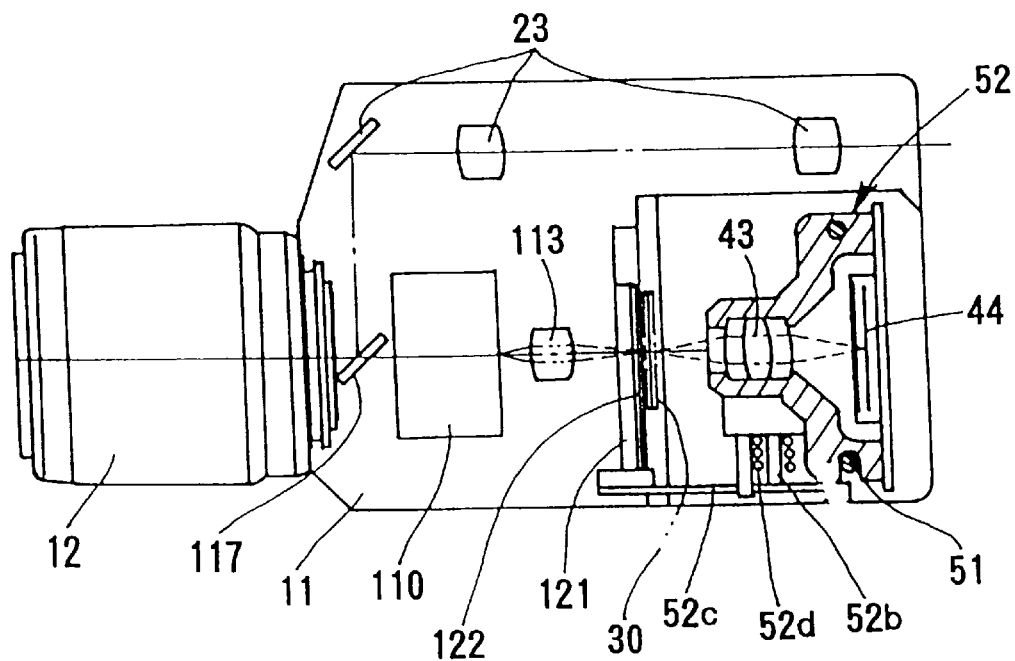
FIG. 33 is a view showing the internal structure of the still video camera shown in FIG. 32, viewed from the side of the camera.
Figure 34:
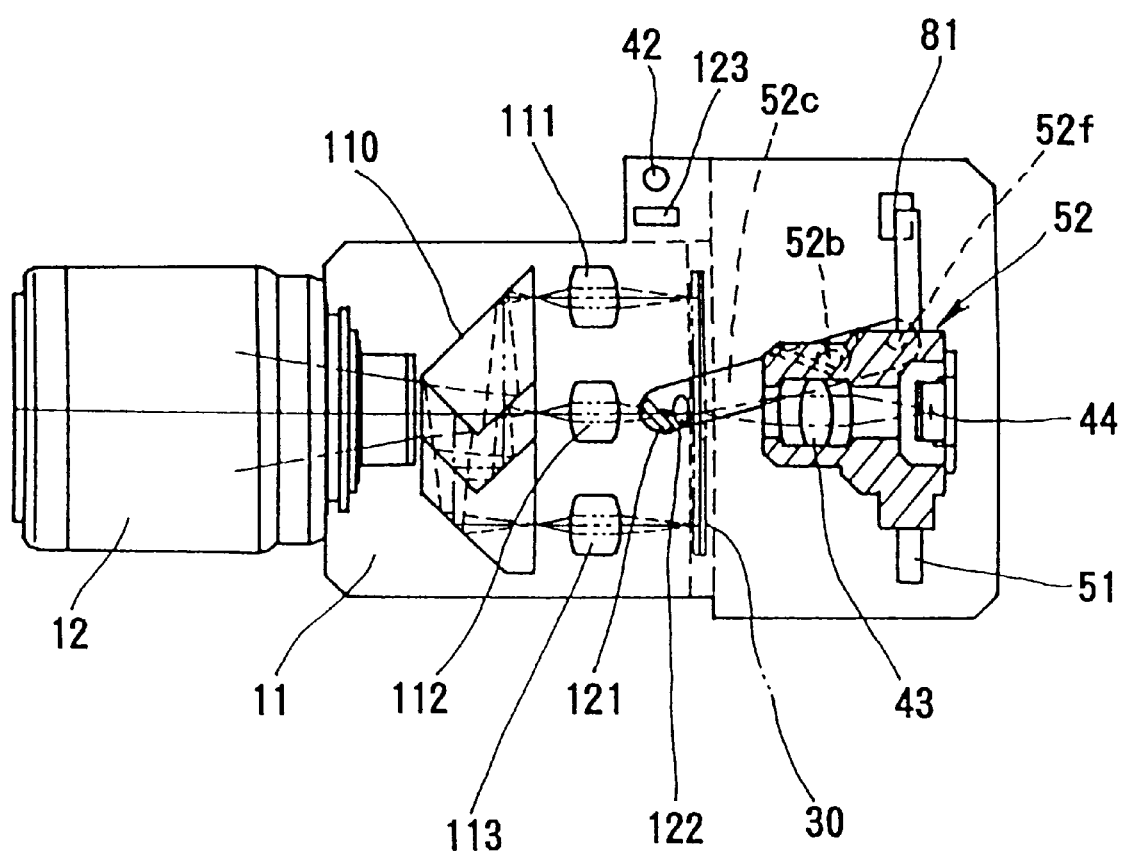
FIG. 34 is a view showing the internal structure of the still video camera, in which an image recorded in the electro-developing recording medium is read out.

FIGS. 32 through 34 show a sixth embodiment of the present invention. In this embodiment, the light source 42 is attached to the camera body 11, and a mirror 121 and a condenser lens 122 are provided on the support plate 52c. A collimator lens 123 for illuminating an illumination light of the light source 42 onto the mirror 121 is provided on the camera body 11. Namely, in the sixth embodiment, the illumination optical system has the light source 42, the collimator lens 123, the mirror 121 and the condenser lens 122. Other constructions are the same as those of the fourth and fifth embodiments.

As shown in FIG. 32, when a photographing operation is performed using the electro-developing recording medium 30, the moving body 52a of the moving mechanism 52 is positioned at the end of the guide shafts 51. Therefore, similar to the fourth and fifth mebodiments, the support plate 52c is rotated since the pin 52f is in contact with the contact member 81, and thus the mirror 121 and the condenser lens 122 are displaced from an optical path between the relay lens 111 and the scanner optical system 43. Namely; the mirror 121 and the condenser lens 122 are retreated to a position so as not to face the electro-developing recording medium 30 and the scanner optical system 43. Therefore, similar to the third through fifth embodiments, an eclipse does not occur on the electro-developing recording medium 30, and similar to the fourth and fifth embodiments, a size of the camera body 11 (i.e., a dimension thereof in the direction of the axis of the guide shafts 51) can be reduced, in comparison with the third embodiment.

When the image formed on the electro-developing recording medium 30 is read out, as shown in FIG. 34, since the moving mechanism 52 is moved along the electro-developing recording medium 30, the pin 52f of the moving mechanism 52 is released from the contact member 81, and thus the support plate 52c is rotated due to a spring force of the spring 52d, so that the mirror 121 and the condenser lens 122 are positioned onto the optical axis of the scanner optical system 43. In this state, the scanner optical system 43 and the line sensor 44 are moved along the electro-developing recording medium 30, so that a sub-scan is performed to read out the image formed on the electro-developing recording medium 30. In this reading operation, a light beam outputted by the light source 42 is reflected by the mirror 121, and is led to the scanner optical system.

As the mechanism for rotating the support plate 52c, the lamp rotation mechanism 83 shown in FIGS. 16 and 17 can be provided in the sixth embodiment.

Figure 35:
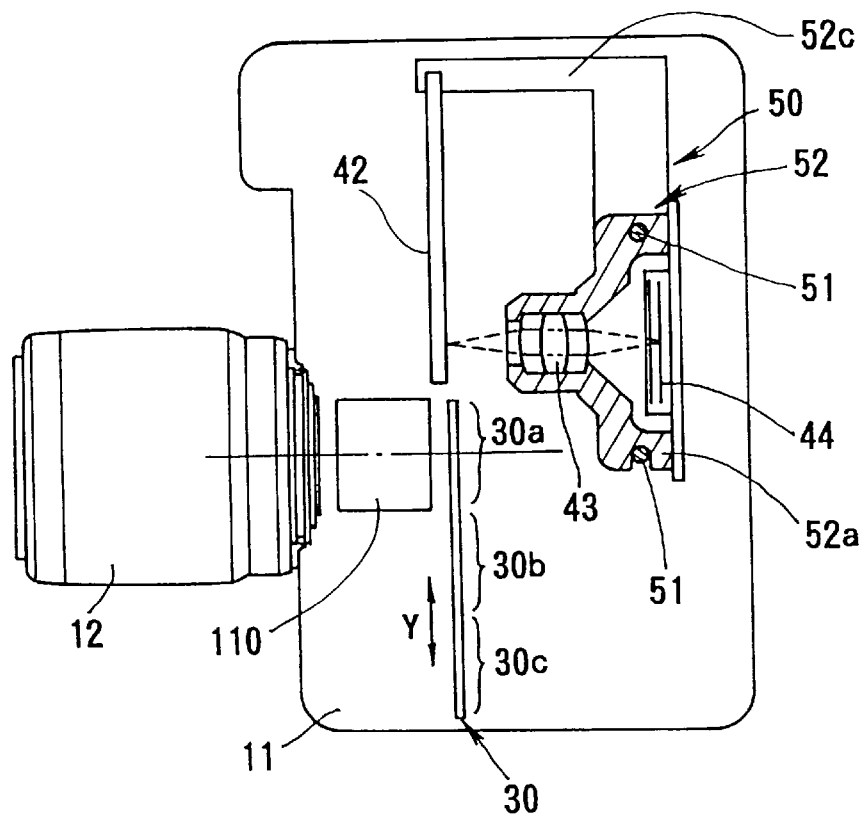
FIG. 35 is a view showing an internal structure of the still video camera, viewed from above the still video camera in a photographing operation in which an image is recorded in a first recording area of an electro-developing recording medium, in a seventh embodiment.
Figure 36:
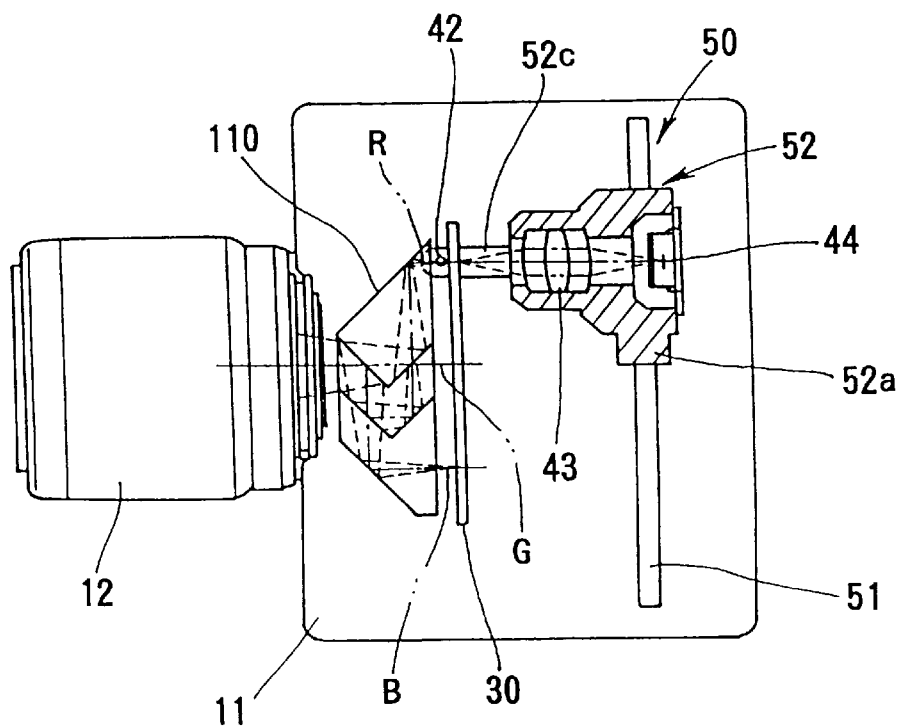
FIG. 36 is a view showing the internal structure of the still video camera shown in FIG. 35, viewed from the side of the camera.
Figure 37:
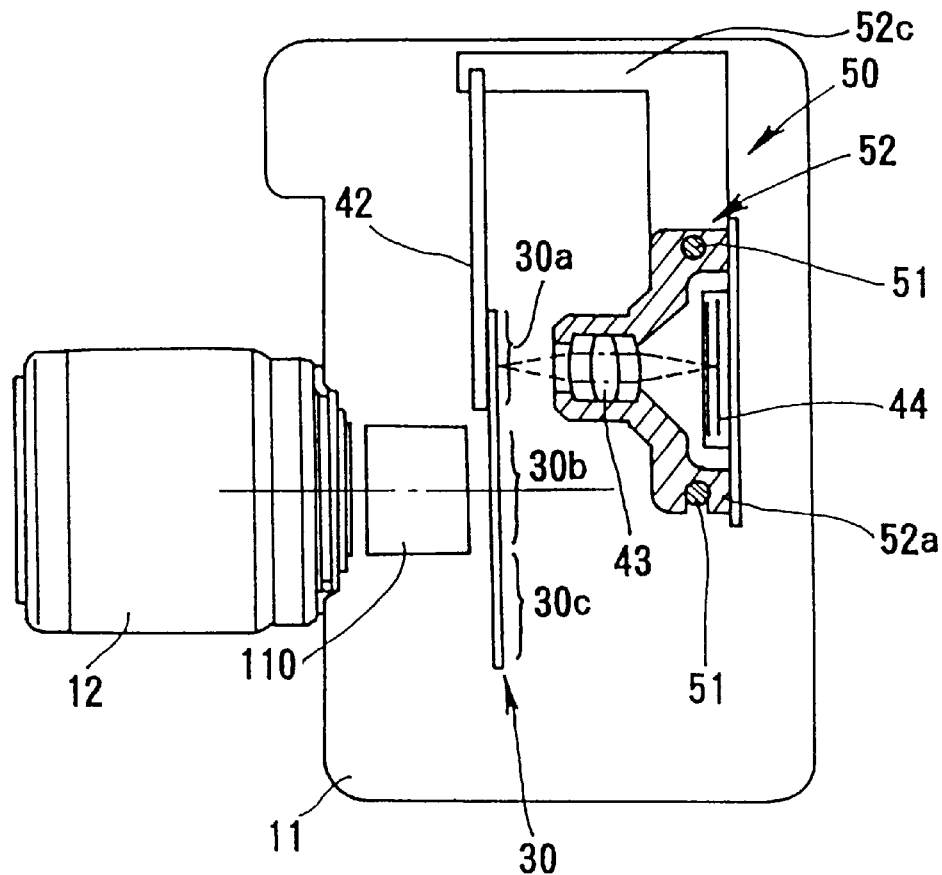
FIG. 37 is a view showing the internal structure of the still video camera in an operation in which an image is recorded in a second recording area of the electro-developing recording medium, or in which an image recorded in the first recording area is read out.
Figure 38:
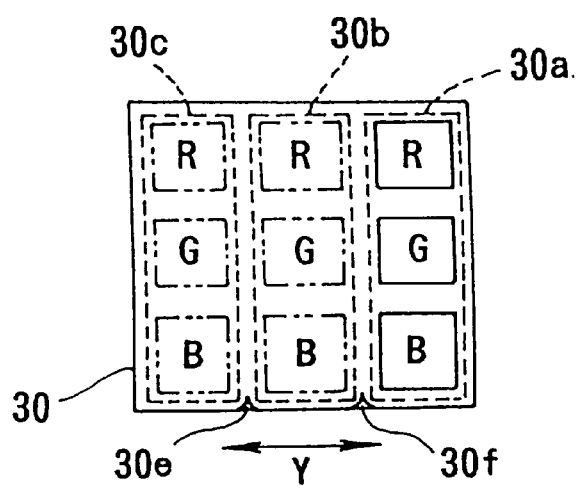
FIG. 38 is a plane view showing an arrangement of the first through third recording areas of the electro-developing recording medium.

FIGS. 35 through 37 show a seventh embodiment of the present invention, and FIG. 38 shows a construction of the electro-developing recording medium 30 used in the seventh embodiment.

In the seventh embodiment, the electro-developing recording medium 30 has first through third recording areas 30a, 30b and 30c, which are aligned in a horizontal direction shown by the arrow Y in the drawing. Namely, three images can be recorded on the electro-developing recording medium 30. Each of the recording areas 30a, 30b and 30c has recording elements in which an image in red (R), green (G) or blue (B), which is obtained by the dichroic prism 110, is recorded. Notches 30e and 30f are formed on peripheral portions which are located between the recording areas 30a and 30b, and between the recording areas 30b and 30c, so that an engaging member (not shown) can be engaged with one of the notches 30e and 30f, and thus the the electro-developing recording medium 30 is positioned at a predetermined position.

The dichroic prism 110 is provided between the photographing optical system 12 and the electro-developing recording medium 30. The electro-developing recording medium 30 is guided by a guide mechanism (not shown) to be able to move in a direction in which the recording areas 30a, 30b and 30c are arranged (the direction being the same as the arrow Y shown in FIGS. 35 and 38). The direction is the same as the lateral direction of the camera body 11, and is normal to the optical axis of the photographing optical system 12, and is also normal to the moving direction of the moving mechanism 52.

In other words, the light source 42 and the scanner optical system 43 can be moved in a normal direction to the optical axis of the photographing optical system 12 and in a direction in which the electro-developing recording medium 30 is moved.

As shown in FIG. 35, in the moving mechanism 52, the moving body 52a is movably supported by the guide shafts 51, and the support plate 52c is rigidly fixed to the moving body 52a. The support plate 52c is extended parallel to the optical axis of the scanner optical system 43, and is offset from the optical axis of the scanner optical system 43 by an amount corresponding to about the length of the electro-developing recording medium 30 in a direction in which the first through third recording areas 30a, 30b and 30c are arranged. The light source 42 is fixed to one surface of the support plate 52c, and is extended to face the front surface of the scanner optical system 43.

Both of the guide shafts 51 are extended in an upright direction of the camera body 11. One of the guide shafts 51 is positioned at the center of the camera body 11, and the other guide shaft 51 is positioned at the edge portion of the camera body 11. Namely, the light source 42, the scanner optical system 43 and the line sensor 44 are provided on a portion which is offset from the optical axis of the photographing optical system 12, and the light source 42 and the line sensor 44 are moved upward and downward while maintaining a horizontal orientation.

FIGS. 35 and 36 show a state in which the center of the first recording area 30a of the electro-developing recording medium 30 is positioned on the optical axis of the photographing optical system 12, in which state the second and third recording areas 30b and 30c do not face the dichroic prism 110. Conversely, as shown in FIG. 37, when the center of the first recording area 30a is positioned on the optical axis of the scanner optical system 43, the center of the second recording area 30b is positioned on the optical axis of the photographing optical system 12. Similarly, when the center of the third recording area 30c is positioned on the optical axis of the photographing optical system 12, the center of the second recording area 30b is positioned on the optical axis of the scanner optical system 43. According to this construction, a reading operation for the first recording area 30a and an exposure operation for the second recording area 30b are performed independently of each other.

The construction of the electric circuit of the seventh embodiment is the same as that of the third embodiment shown in FIG. 25. Note that, in the seventh embodiment, the recording medium drive circuit 41 is constructed in such a manner that an electric voltage is applied to each electrode corresponding to each of the recording areas 30a, 30b and 30c.

An operation of the seventh embodiment is described below.

When an image is recorded in the first recording area 30a of the electro-developing recording medium 30, the center of the first recording area 30a is positioned on the optical axis of the photographing optical system 12 as shown in FIG. 35.

In this state, when the recording area 30a is exposed while an electric voltage is applied to electrodes corresponding to the recording area 30a, the object image is developed in the liquid crystal 40 of the recording area 30a. When an image is recorded in the second recording area 30b, the center of the recording area 30b is positioned on the optical axis of the photographing optical system 12 as shown in FIG. 37, and the same operation as in the first recording area 30a is performed.

On the other hand, when the image developed in the first recording area 30a is read out therefrom by the line sensor 44, the first recording area 30a is positioned on the optical axis of the scanner optical system 43 as shown in FIG. 37. Then, the moving mechanism 52 is displaced along the guide shafts 51, so that the image, which is formed on the electro-developing recording medium 30 and illuminated by the light source 42, is read out by the line sensor 44. At this time, the second recording area 30b is positioned on the optical axis of the photographing optical system 12. Therefore, as described above, an electric voltage is applied to electrodes corresponding to the second recording area 30b, and a photographing operation for the second recording area 30b is carried out. Namely, while a reading operation for the recording area 30a is performed, an exposure operation for the other recording area 30b is performed, so that the time for carrying out a photographing operation for the next frame is shortened.

As described above, according to this embodiment, since the light source 42 is positioned at a portion offset from the optical axis of the photographing optical system 12, an eclipse does not occur. Further, since the scanner optical system 43 is positioned at a portion offset from the optical axis of the photographing optical system 12, the reflected light beam from the scanner optical system 43 does not affect the electro-developing recording medium 30. Therefore, quality of the image formed on the electro-developing recording medium 30 is prevented from being lowered. Further, since there is no element between the dichroic prism 110 and the electro-developing recording medium 30, the distance therebetween can be reduced as short as possible, so that a back focus of the photographing optical system 12 is reduced by the amount corresponding to the distance, whereby the degree of freedom in the design of the photographing optical system 12 is increased.

Note that the electro-developing recording medium 30 is not restricted to the structure described above, and may be any other structure by which an image is electronically developed.

The present invention is not restricted to a single-lens reflex camera described above, but can be applied to a lens shutter camera.

A single lens, a micro-lens array, a self-focusing lens array or so on may be used for the scanner optical system 43.

Further, the recording medium mounted in the image recording device 67 may be a magnetic recording medium such as a hard disk or a magneto-optic recording medium such as a magneto-optic disc.

The line sensor 44 may be disposed in such a manner that a light beam reflected by the electro-developing recording medium 30 is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 6-301467 and 6-301468

(filed on Nov. 10, 1994) and No. 6-315489 (filed on Nov. 25, 1994) which are expressly incorporated herein, by reference, in their entirety.

I claim:

1. A device for controlling an image signal recording operation, comprising:

a photographing optical system;

an electro-developing recording medium electronically developing an image formed by said photographing optical system;

an illumination optical system illuminating said electro-developing recording medium;

a scanner optical system positionable in an optical path of a light beam which is output by said illumination optical system and which passes through said electro-developing recording medium;

a moving mechanism that moves said scanner optical system parallel to said electro-developing recording medium, said illumination optical system and said scanner optical system being carried by said moving mechanism, whereby said illumination optical system moves with said scanner optical system;

said moving mechanism moving said illumination optical system to a position offset from an optical path of said photographing optical system wherein said photographing optical system forms an image onto said electro-developing recording medium.

2. A control device according to claim 1, wherein said moving mechanism moves said scanner optical system so as not to face said electro-developing recording medium when said photographing optical system forms an image onto said electro-developing recording medium.

3. A control device according to claim 1, wherein said electro-developing recording medium comprises an electro-static information recording medium generating an electric charge in accordance with an image formed thereon, and an electric charge keeping medium which generates a visible image in accordance with said electric charge and which can keep said visible image.

4. A control device according to claim 3, wherein said electric charge keeping medium comprises a dispersion type liquid crystal display.

5. A control device according to claim 1, wherein said illumination optical system has a light source, which is placed on the optical axis of said scanner optical system.

6. A control device according to claim 1, further comprising a support member rotatably provided on said moving mechanism, said illumination optical system having a light source provided on said support memeber.

7. A control device according to claim 6, wherein said moving mechanism has a guide shaft along which said scanner optical system moves, and a contact member provided on said guide shaft, said support member being rotated by contacting said contact member so that said light source moves to a position where said light source does not face said electro-developing recording medium.

8. A control device according to claim 7, wherein said light source faces said electro-developing recording medium, when said support member does not contact said contact member.

9. A control device according to claim 7, further comprising a support member rotatably provided on said moving mechanism, said illumination optical system having a light source, and a mirror reflecting a light beam outputted by said light source to said scanner optical system, said mirror being provided on said support member.

10. A control device according to claim 9, wherein said moving mechanism comprises a guide shaft along which said scanner optical system moves, and a contact member provided on said guide shaft, said support member being rotated by contacting said contact member so that said mirror is offset from the optical axis of said scanner optical system.

11. A control device according to claim 9, wherein said mirror is positioned on the optical axis of said scanner optical system when said support member is released from said contact member.

12. The device according to claim 1, said device being operable in a recording mode and in a reproducing mode, wherein in said recording mode, said moving mechanism moves said illumination optical system and said scanner optical system to a position offset from an optical path of said photographing optical system to enable said photographing optical system to develop an image in said electro-developing recording medium and is in said reproducing mode, said moving system positions said illumination optical system and said scanner optical system on the optical path of said photographing optical system to enable said illumination optical system and said scanner optical system to scan an image formed in said electro-developing recording medium.

13. The device according to claim 1, said illumination optical system being positioned between said photographing optical system and said electro-developing recording medium, said moving system moving said illumination optical system within a space between said photographing optical system and said electro-developing recording medium.

14. The device according to claim 13, said scanner optical system being positioned rearwardly of said photographing optical system and said electro-developing recording medium.

15. The device according to claim 1, said moving mechanism carrying said illumination optical system, said scanner optical system, and a line sensor for movement together along a direction parallel to a plane of said electro-developing recording medium.

16. The device according to claim 1, said scanner optical system comprising a micro lens array.

17. The device according to claim 1, said scanner optical system comprising a self-focusing lens array.

18. The device according to claim 1, said scanner optical system comprising a single lens.

19. The device according to claim 1, said moving mechanism moving said scanner optical system and said illumination optical system along a scanning range in which an image recorded on said electro-developing recording medium is scanned and moves said illumination optical system to a position beyond said scanning range to enable said photographing optical system to record an image in said electro-developing recording medium.

20. An image signal recording and reading apparatus, said apparatus comprising:

a photographing optical system;

an electro-developing recording medium that electronically develops an image formed thereon by said photographing optical system;

an illuminating optical system that illuminates said electro-developing recording medium;

a scanner optical system that is positioned along a path of a light beam output by said illuminating optical system and which passes through said electro-developing recording medium;

said photographing optical system and said illuminating optical system being positioned on a first side of said electro-developing recording medium and said scanner optical system being positioned on a second side of said electro-developing recording medium;

an optical axis of said photographing optical system being parallel to an optical axis defined between said illuminating optical system and said scanner optical system;

a moving mechanism that moves said scanner optical system parallel to said electro-developing recording medium;

said moving mechanism moving said illuminating optical system to a position spaced from an optical path of said photographing optical system when said photographing optical system forms an image onto said electro-developing recording medium and moves said illuminating optical system onto the optical path of said photographing optical system when said scanner optical system reads an image formed on said electro-developing recording medium.

21. The device according to claim 20, said illuminating optical system and said scanner optical system being mounted to said moving mechanism so that said moving mechanism moves said illumination optical system and said scanner optical system.

* * * * *